United States Patent
Uchiyama et al.

(10) Patent No.: US 10,506,441 B2
(45) Date of Patent: Dec. 10, 2019

(54) DEVICE AND METHOD FOR ASSIGNING SUBFRAMES AS BLANK SUBFRAMES

(71) Applicant: SONY CORPORATION, Tokyo (JP)

(72) Inventors: Hiromasa Uchiyama, Tokyo (JP); Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 200 days.

(21) Appl. No.: 15/303,443

(22) PCT Filed: Mar. 4, 2015

(86) PCT No.: PCT/JP2015/056429
§ 371 (c)(1),
(2) Date: Oct. 11, 2016

(87) PCT Pub. No.: WO2015/178068
PCT Pub. Date: Nov. 26, 2015

(65) Prior Publication Data
US 2017/0041800 A1 Feb. 9, 2017

(30) Foreign Application Priority Data

May 20, 2014 (JP) ................................ 2014-104238

(51) Int. Cl.
*H04W 16/04* (2009.01)
*H04W 88/12* (2009.01)
(Continued)

(52) U.S. Cl.
CPC ....... *H04W 16/04* (2013.01); *H04W 72/0446* (2013.01); *H04W 88/08* (2013.01);
(Continued)

(58) Field of Classification Search
CPC .. H04W 16/04; H04W 72/0446; H04W 16/32
(Continued)

(56) References Cited

U.S. PATENT DOCUMENTS

2013/0065599 A1* 3/2013 Chan ..................... H04W 16/18
455/446
2013/0084879 A1* 4/2013 Abe ..................... H04W 72/082
455/452.1
(Continued)

FOREIGN PATENT DOCUMENTS

JP 2012-231366 A 11/2012

OTHER PUBLICATIONS

ZTE (Interference avoidance and coordination enhancement in small cell, Apr. 15-19, 2013, 7 pages).*
(Continued)

*Primary Examiner* — Jae Y Lee
*Assistant Examiner* — Jean F Voltaire
(74) *Attorney, Agent, or Firm* — Xsensus LLP

(57) ABSTRACT

[Object] To make it possible to suppress deterioration of communication quality of a terminal device while reducing interference from a small cell.
[Solution] There is provided a device including: an acquiring unit configured to acquire information about a plurality of small cells; and a control unit configured to assign blank subframes in which no signal is transmitted and received to each of the plurality of small cells. The control unit assigns the same subframes to one or more small cells that are a part of the plurality of small cells as the blank subframes and does not assign the same subframes to the remaining small cells among the plurality of small cells as the blank subframes.

20 Claims, 24 Drawing Sheets

(51) Int. Cl.
  *H04W 88/08* (2009.01)
  *H04W 72/04* (2009.01)
  *H04W 84/10* (2009.01)
  *H04W 72/08* (2009.01)
  *H04W 16/32* (2009.01)

(52) U.S. Cl.
  CPC ............ *H04W 88/12* (2013.01); *H04W 16/32* (2013.01); *H04W 72/0433* (2013.01); *H04W 72/082* (2013.01); *H04W 72/085* (2013.01); *H04W 84/105* (2013.01)

(58) Field of Classification Search
  USPC .......................................................... 370/329
  See application file for complete search history.

(56) References Cited

U.S. PATENT DOCUMENTS

2013/0343214 A1* 12/2013 Yamamoto .......... H04W 72/085
  370/252
2014/0293952 A1* 10/2014 Maniatis ............... H04L 5/0001
  370/329
2015/0050940 A1*  2/2015 Cai ..................... H04W 72/082
  455/452.2

OTHER PUBLICATIONS

NTT DOCOMO (Performance Evaluation of ICIC for SCE, dated Aug. 19-23, 2013, 6 pages).*
Panasonic (ICIC among small cells, dated May 20-24, 2013, 10 pages).*
International Search Report dated Jun. 2, 2015 in PCT/JP2015/056429 filed Mar. 4, 2015.
NTT DOCOMO, "Performance Evaluation of ICIC for SCE" 3GPP TSG RAN WG1 Meeting #74 R1-133459, Aug. 19-23, 2013, pp. 1-6.
Panasonic, "ICIC among small cells" 3GPP TSG RAN WG1 Meeting #73 R1-132139, May 20-24, 2013, pp. 1-10.
ZTE, "Interference avoidance and coordination enhancement in small cell" 3GPP TSG RAN WG1 Meeting #72bis R1-131060, Apr. 15-19, 2013, 7 pages.

* cited by examiner

FIG. 5

| SFN | GAP | SUBFRAME | | | | | | | | | |
|---|---|---|---|---|---|---|---|---|---|---|---|
| | | 0 | 1 | 2 | 3 | 4 | 5 | 6 | 7 | 8 | 9 |
| 0 | GAP | G | G | G | G | G | G | | | | |
| 1 | | | | | | | | | | | |
| 2 | | | | | | | | | | | |
| 3 | | | | | | | | | | | |
| 4 | GAP | G | G | G | G | G | G | | | | |
| 5 | | | | | | | | | | | |
| 6 | | | | | | | | | | | |
| 7 | | | | | | | | | | | |
| 8 | GAP | G | G | G | G | G | G | | | | |
| 9 | | | | | | | | | | | |

DEVICE AND METHOD FOR ASSIGNING SUBFRAMES AS BLANK SUBFRAMES

TECHNICAL FIELD

The present disclosure relates to a device.

BACKGROUND ART

Currently, in cellular systems, a small cell on/off technology is being focused on. Through the small cell on/off technology, an on/off state of a small cell is adaptively switched and thus it is possible to reduce interference with a neighbor cell of the small cell. Various technologies for switching the on/off state of a small cell are proposed.

For example, in Patent Literature 1, a technology in which transmission power is controlled in an environment in which the on/off state of a small cell is switched and thus coverage is ensured is disclosed.

CITATION LIST

Patent Literature

Patent Literature 1 JP 2012-231366A

SUMMARY OF INVENTION

Technical Problem

However, there is a possibility of communication quality of a terminal device deteriorating when a small cell is switched to an off state. For example, when a small cell positioned at a cell edge of a macro cell is switched to the off state and a terminal device that was performing communication in the small cell performs communication in the macro cell, communication quality of the terminal device may significantly deteriorate. That is, there is a possibility of a coverage hole being generated when a small cell is switched to the off state.

Therefore, it is preferable to provide a mechanism through which it is possible to suppress deterioration of communication quality of a terminal device while reducing interference from a small cell.

Solution to Problem

According to the present disclosure, there is provided a device including: an acquiring unit configured to acquire information about a plurality of small cells; and a control unit configured to assign blank subframes in which no signal is transmitted and received to each of the plurality of small cells. The control unit assigns the same subframes to one or more small cells that are a part of the plurality of small cells as the blank subframes and does not assign the same subframes to the remaining small cells among the plurality of small cells as the blank subframes.

According to the present disclosure, there is provided a device including: an acquiring unit configured to acquire information indicating decision of switching of a small cell from an on state to an off state; and a control unit configured to request that the switching be canceled.

According to the present disclosure, there is provided a device including: a control unit configured to decide to switch a small cell from an on state to an off state; and an acquiring unit configured to acquire a request that the switching be canceled. The control unit cancels the switching in response to the request.

Advantageous Effects of Invention

According to the present disclosure described above, it is possible to suppress deterioration of communication quality of a terminal device while reducing interference from a small cell. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is an explanatory diagram for describing an example of a measurement gap.

DESCRIPTION OF EMBODIMENT(S)

Figure 1:
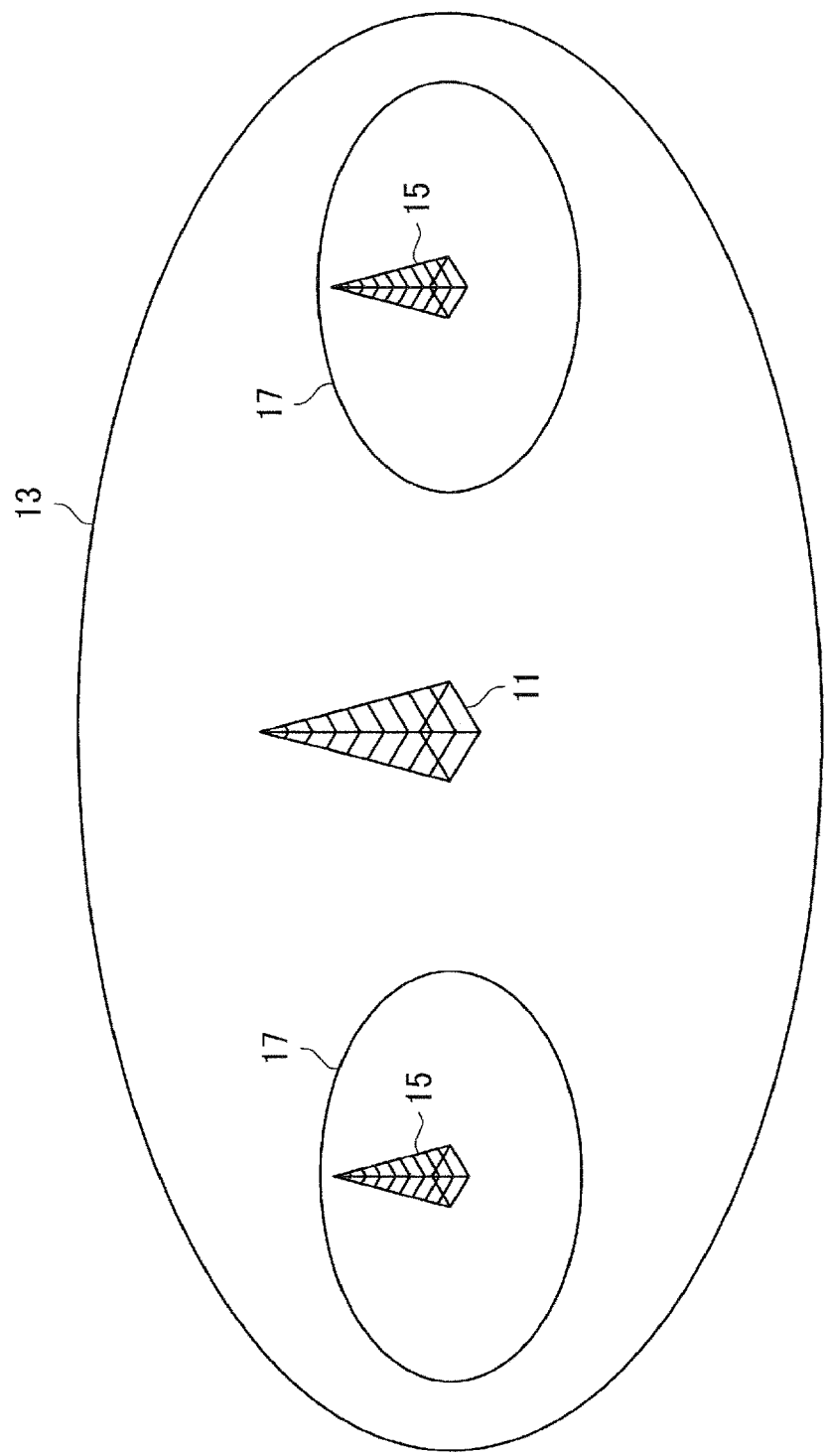
FIG. 1 is an explanatory diagram for describing an example of a small cell.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

In this specification and the appended claims, elements having substantially the same function and structure may in some cases be distinguished by different letters appended to the same sign. For example, multiple elements having substantially the same function and structure are distinguished as small base stations 15A, 15B and 15C as necessary. On the other hand, when none of the multiple elements having substantially the same function and structure is particularly distinguished, only the same sign will be given. For example, the small base stations 15A, 15B and 15C will be simply designated as the small base station 15 when not particularly distinguished.

The description will proceed in the following order.
1. Introduction
 1.1. Related technology
 1.2. Problems related to switching of on/off state of small cell
2. Schematic configuration of communication system according to present embodiment
3. First embodiment
 3.1. Configuration of communication system
 3.2. Configuration of control entity
 3.3. Process flow
4. Second embodiment
 4.1. Configuration of communication system
 4.2. Configuration of terminal device
 4.3. Configuration of control entity
 4.4. Process flow
5. Application examples
 5.1. Application examples for control entity
 5.2. Application examples for terminal device
6. Conclusion

1. INTRODUCTION

First, a technology related to an embodiment of the present disclosure and problems related to switching of an on/off state of a small cell will be described with reference to FIG. 1 to FIG. 9.
<1.1. Related Technology>
A technology related to an embodiment of the present disclosure will be described with reference to FIG. 1 to FIG. 8. Specifically, a small cell, a measurement and carrier aggregation will be described.
(Small Cell)
(a) Small Cell
A small cell is a cell smaller than a macro cell. For example, the small cell partially or entirely overlaps the macro cell. Hereinafter, an example of the small cell will be described with reference to FIG. 1.

FIG. 1 is an explanatory diagram for describing an example of a small cell. Referring to FIG. 1, a macro base station 11, a macro cell 13, a small base station 15 and a small cell 17 are shown. The macro base station 11 is a base station of the macro cell 13. The small base station 15 is a base station of the small cell 17. In other words, the macro cell 13 is a coverage area of the macro base station 11 (that is, a communication area), and the small cell 17 is a coverage area of the small base station 15 (that is, a communication area).

A base station of LTE is referred to as an evolved node B (eNB). Here, a macro base station of LTE is referred to as a macro eNB, and a small base station of LTE is referred to as a small eNB. In addition, a terminal device of LTE is referred to as user equipment (UE).
(b) Small Cell Cluster
Small cells arranged at a high density form a small cell cluster. Hereinafter, an example of the small cell cluster will be described with reference to FIG. 2.

Figure 2:
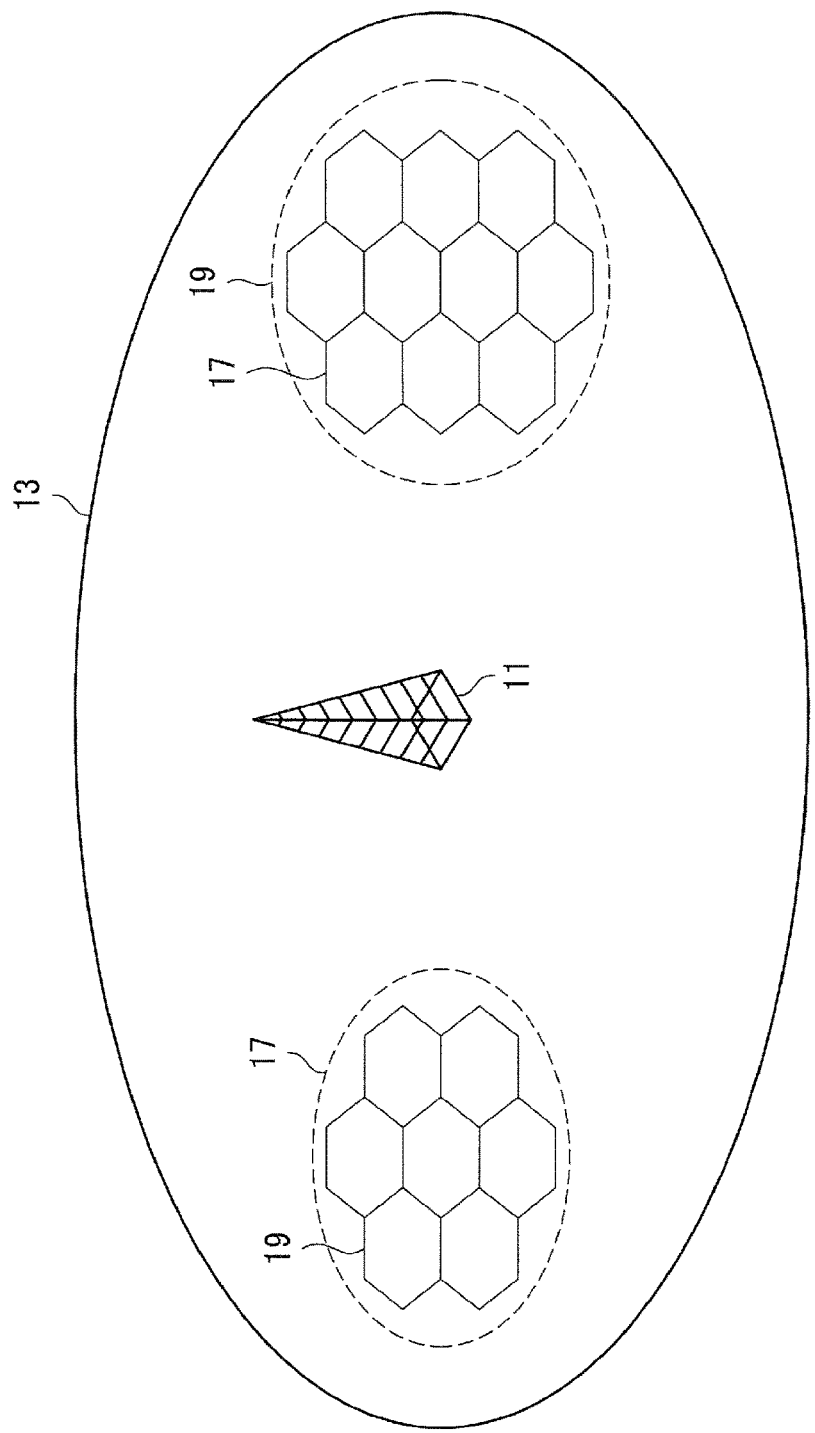
FIG. 2 is an explanatory diagram for describing an example of a small cell cluster.

FIG. 2 is an explanatory diagram for describing an example of a small cell cluster. Referring to FIG. 2, the macro base station 11, the macro cell 13 and the small cell 17 are shown. For example, small cells 17 arranged at a high density form a small cell cluster 19.
(c) Small Cell on/Off
In a case in which small cells are arranged at a high density, inter-cell interference causes a serious problem. In general, the small base station transmits a cell-specific reference signal (CRS) regardless of the presence or absence of traffic of the small cell. In the case in which small cells are arranged at a high density, it is known that a CRS causes large interference in a neighbor cell. Therefore, various technologies for reducing interference are being studied.

As a technology for reducing such inter-cell interference, a small cell on/off technology has currently been focused on. In the small cell on/off technology, an on/off state of a small cell is adaptively switched, and thus it is possible to suppress interference in a surrounding cell of the small cell. While a trigger for switching an on/off state of the small cell has not yet been specifically decided, a trigger for switching based on, for example, a traffic amount, association of a terminal device, or arrival of a packet is being studied. Hereinafter, an example of a small cell on/off procedure will be described with reference to FIG. 3.

Figure 3:
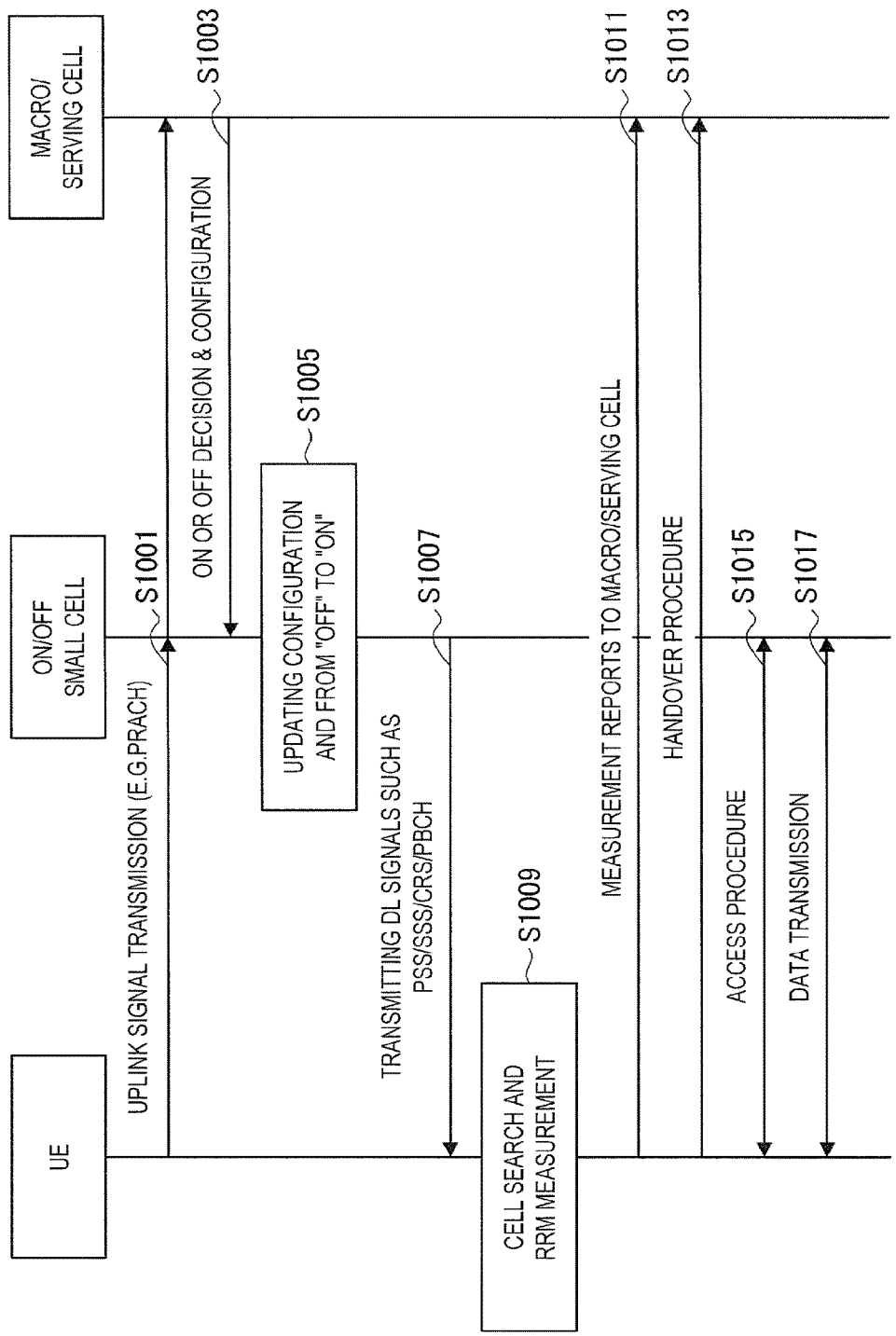
FIG. 3 is a sequence diagram illustrating an example of a schematic flow of an on/off process of a small cell.

FIG. 3 is a sequence diagram illustrating an example of a schematic flow of a small cell on/off process. The small cell on/off process is a process that is disclosed in R1-134318 of the Third Generation Partnership Project (3GPP). When data to be transmitted is generated, the UE transmits an uplink signal to a macro eNB of a macro cell that is a serving cell (S1001). Then, the macro eNB searches for a small eNB in an off state that is positioned around the UE, and instructs the appropriate small eNB to switch to an on state when there is an appropriate small eNB (S1003). Then, the small eNB performs switching from the off state to the on state (S1005). Then, the small eNB transmits downlink signals such as a primary synchronization signal (PSS), a secondary synchronization signal (SSS), a cell-specific reference signal (CRS) and a physical broadcast channel (PBCH) signal (S1007). In addition, the UE performs a cell search and RRM measurement (S1009), and performs measurement reporting to the macro eNB (S1011). Then, a handover of the UE from the macro cell to the small cell is performed (S1013). Then, the UE and the small eNB perform an access procedure (S1015) and perform data transmission (S1017).

According to the procedure shown in FIG. 3, it is possible to switch an on/off state of a small cell. However, according to the procedure, a transition time may become relatively longer. That is, according to the procedure, a time from when a terminal device attempts to transmit data until the terminal device actually transmits the data may become relatively longer. Therefore, large improvement of throughput is difficult. In order to improve the transition time, while the small cell is in the off state, a measurement process that serves as a main delay factor is preferably performed by the terminal device.

(d) Discovery Reference Signal

Introduction of a discovery reference signal (DRS) is being studied in order to reduce the transition time. The DRS enables measurement of a small cell in the off state. The DRS is also referred to as a discovery signal (DS). A small base station (for example, a small eNB) transmits a DRS while a small cell (or a small base station) is in the off state, and a terminal device (for example, UE) performs measurement based on a DRS. Hereinafter, an example of a small cell on/off procedure when a DRS is used will be described with reference to FIG. 4.

Figure 4:
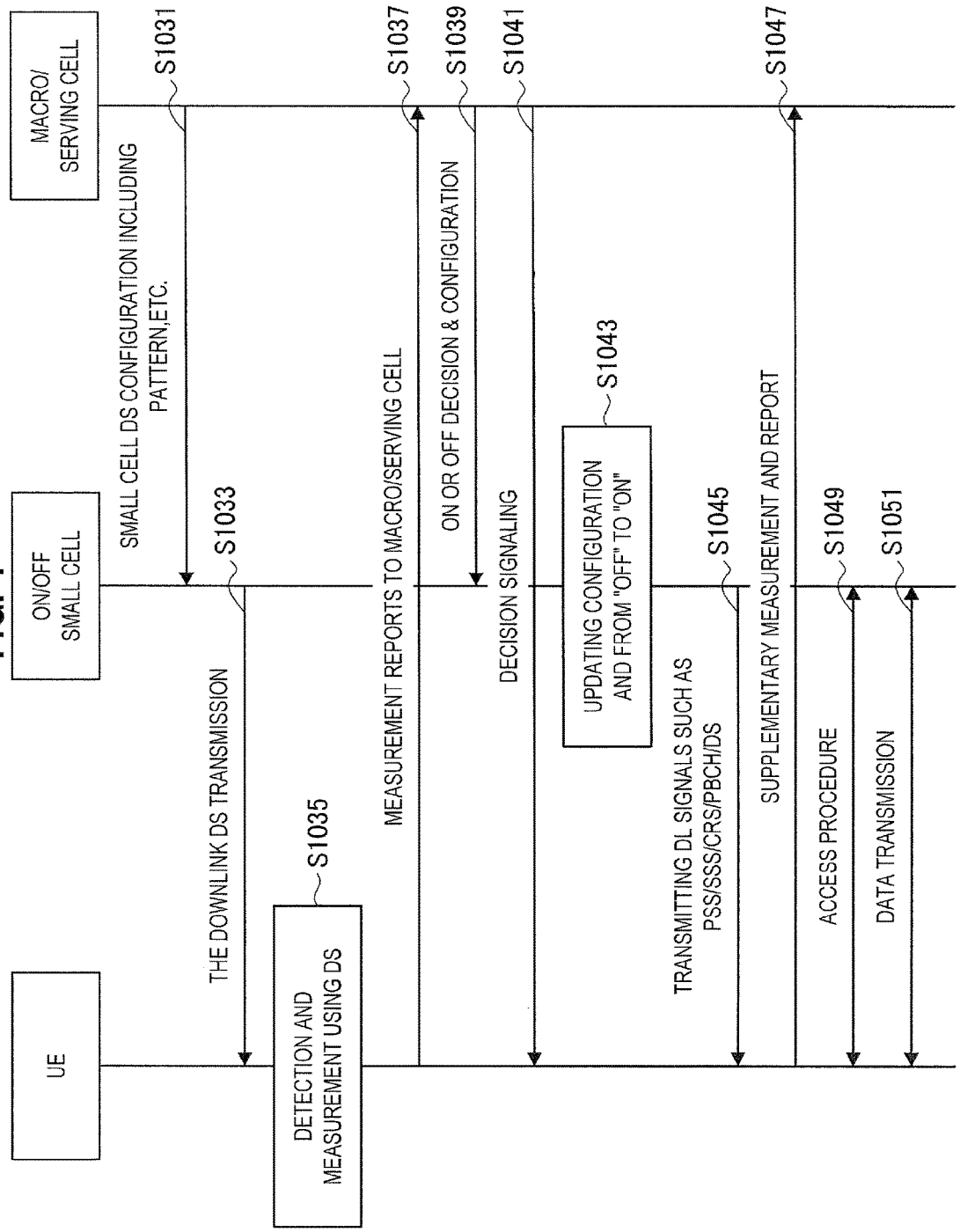
FIG. 4 is a sequence diagram illustrating an example of a schematic flow of an on/off process of a small cell when a DRS is used.

FIG. 4 is a sequence diagram illustrating an example of a schematic flow of a small cell on/off process when a DRS is used. The small cell on/off process is a process that is disclosed in R1-134318 of the 3GPP. A macro eNB instructs a small eNB to transmit a DS (S1031), and the small eNB transmits the DS in downlink (S1033). The UE performs measurement based on the DS (S1035) and reports a result of the measurement to the macro eNB (that is, an eNB of a macro cell that is a serving cell) (S1037). The UE and the small eNB perform data transmission through subsequent procedures (S1041 to S1049) (S1051).

According to the procedure shown in FIG. 4, while the small cell is in the off state, the terminal device can perform measurement. Therefore, the transition time is removed and throughput may be improved.

As various technologies for reducing interference, enhancement on a transmission side and a reception side such as muting, multiple instance and interference cancellation is also being studied.

(Measurement)

(a) CRS Measurement

In LTE, a terminal device performs measurement based on a CRS transmitted by a base station. Specifically, the terminal device receives a CRS transmitted by a base station and thus performs measurement of quality of a propagation path between the base station and the terminal device. The measurement is referred to as "radio resource management (RRM) measurement," or is simply referred to as "measurement."

A result of the measurement is used to select a cell for a terminal device. As a specific example, the result of the measurement is used for cell selection/cell reselection by a terminal device that is in a radio resource control (RRC) idle (RRC Idle) state. In addition, for example, the result of the measurement is reported to a base station by a terminal device that is in an RRC connected state and is used for a handover decision by the base station.

(b) RSRP and RSRQ

In LTE, CRS measurement is measurement of reference signal received power (RSRP) and/or reference signal received quality (RSRQ). In other words, a terminal device acquires RSRP and/or RSRQ as a result of the measurement of the CRS. The RSRQ is calculated from the RSRP and a received signal strength indicator (RSSI).

The RSRP is received power of a CRS for each single resource element. That is, the RSRP is an average value of received power of the CRS. The received power of the CRS is obtained by detecting a correlation between a reception signal in a resource element of the CRS and a known signal CRS. The RSRP corresponds to a desired signal "Signal (S)."

The RSSI is total power of signals for each Orthogonal Frequency Division Multiple Access (OFDMA) symbol. Therefore, the RSSI includes a desired signal, an interference signal and noise. That is, the RSSI corresponds to "Signal (S)+Interference (I)+Noise (N)."

The RSRQ is RSRP/(RSRI/N). N denotes the number of resource blocks used for calculating an RSSI. The resource blocks are resource blocks that are arranged in a frequency direction. Therefore, the RSRQ is a value that is obtained by dividing the RSRP using the RSRI for each resource block. That is, the RSRQ corresponds to a signal-to-interference-plus-noise ratio (SINR).

As described above, according to the measurement of the CRS, received power (that is, RSRP) and received quality (that is, RSRQ) such as an SINR are obtained.

(c) Measurement Timing

Measurement of a frequency band that a terminal device uses is referred to as intra-frequency measurement. Conversely, measurement of a frequency band that a terminal device does not use is referred to as inter-frequency measurement.

The terminal device can receive a CRS transmitted in a frequency band that is used without switching a frequency of a radio frequency (RF) circuit. That is, it is unnecessary to switch a frequency of the RF circuit for intra-frequency measurement.

Conversely, in order for the terminal device to receive a CRS transmitted in a frequency band that is not used, it is necessary to switch a frequency of a radio frequency (RF) circuit. That is, it is necessary to switch a frequency of the RF circuit for inter-frequency measurement. Therefore, a period called a measurement gap is used for inter-frequency measurement.

During the measurement gap, the base station does not transmit a downlink signal addressed to a terminal device. In addition, the measurement gap is shared between the base station and the terminal device. For example, the base station transmits a message (for example, an RRC connection reconfiguration message) including information indicating a measurement gap to the terminal device. For example, the measurement gap is indicated by a measurement gap length (MGL), a measurement gap repetition period (MGRP) and a gap offset. In addition, a combination of the MGL and the MGRP is determined as, for example, a gap pattern. Hereinafter, an example of the measurement gap will be described with reference to FIG. 5.

FIG. 5 is an explanatory diagram for describing an example of a measurement gap. FIG. 5 shows a matrix including columns of radio frames whose SFNs are 0 to 9 and rows of 10 subframes (subframes whose subframe numbers are 0 to 9) included in radio frames. In this example, the MGL is 6 milliseconds (ms), the MGRP is 40 ms, and the gap offset is 0. Therefore, the measurement gap has a length of 6 ms and appears every 40 ms. More specifically, for example, six subframes whose subframe numbers are 0 to 5 among radio frames whose SFNs are 0, 4 and 8 are the measurement gap. Inter-frequency measurement is performed during the measurement gap.

(d) Measurement Reporting

The terminal device reports a measurement result to the base station. The reporting is referred to as measurement reporting.

The measurement reporting is periodic reporting or event-triggered reporting. The periodic reporting is reporting that is performed at set periods. Conversely, the event-triggered reporting is reporting that is performed when a reporting event is generated. Reporting events A1 to A5 are events associated with a handover within a system, and reporting events B1 to B2 are events associated with a handover between systems.

TABLE 1

| Event Type | Description |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

(Carrier Aggregation)

Carrier aggregation (CA) is a technology through which communication is performed using a plurality of component carriers (CCs) at the same time. The component carrier is a frequency band having a maximum of a 20 MHz bandwidth. The carrier aggregation includes three scenarios. Hereinafter, three scenarios of the carrier aggregation will be described with reference to FIG. 6 to FIG. 8.

Figure 6:
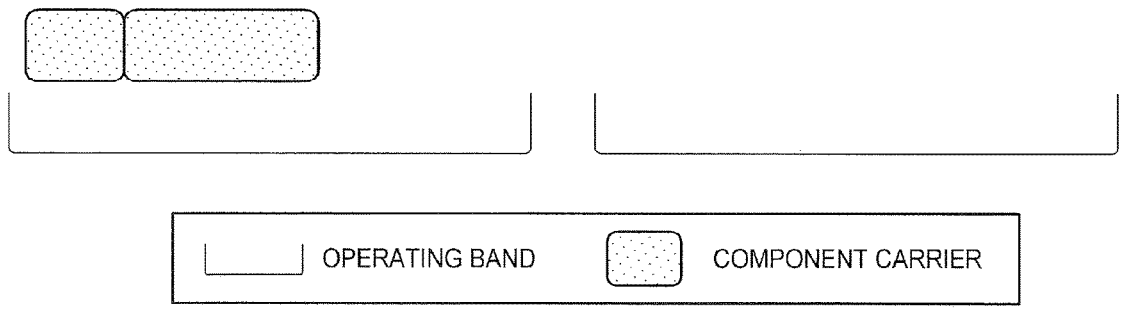
FIG. 6 is an explanatory diagram for describing a first scenario of carrier aggregation (CA).
Figure 7:
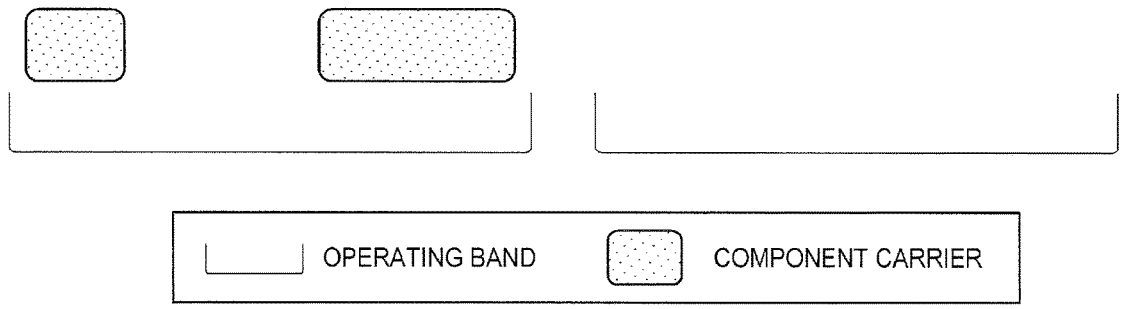
FIG. 7 is an explanatory diagram for describing a second scenario of carrier aggregation (CA).
Figure 8:
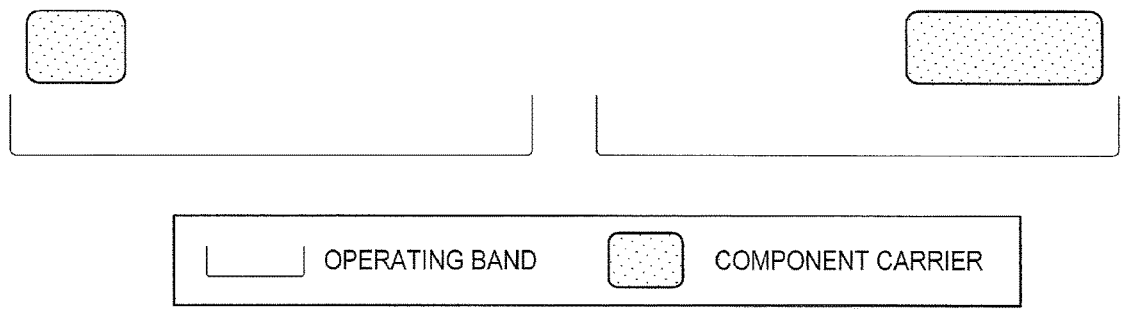
FIG. 8 is an explanatory diagram for describing a third scenario of carrier aggregation (CA).

FIG. 6 to FIG. 8 are explanatory diagrams for describing first to third scenarios of carrier aggregation (CA). As illustrated in FIG. 6, in the first scenario (intra-band contiguous) of CA, the terminal device uses CCs adjacent in the same operating. As illustrated in FIG. 7, in the second scenario (intra-band non-contiguous) of CA, the terminal device uses CCs that are not adjacent in the same operating. As illustrated in FIG. 8, in the third scenario (inter-band non-contiguous) of CA, the terminal device uses CCs that are not adjacent in different operating.

<1.2. Problems Related to Switching of on/Off State of Small Cell>

Next, problems related to switching of the on/off state of a small cell will be described with reference to FIG. 9.

On/off state switching of a small cell is performed based on, for example, a traffic load, a cell association of a terminal device and/or a packet arrival. For example, when there is a terminal device in the small cell, the small cell is specifically switched to the on state and a base station of the small cell communicates with the terminal device. Conversely, when there is no terminal device in the small cell, the small cell is switched to the off state in order to reduce unnecessary interference.

When the on/off state of the small cell is switched according to the above-described criteria, although efficient on/off state switching seems to be possible, this may not necessarily be the case. For example, in a case in which terminal devices are equally distributed at a low density within a small cell cluster, the number of small cells that are switched to the off state is small and interference is not easily reduced. Hereinafter, this will be described with reference to a specific example of FIG. 9.

Figure 9:
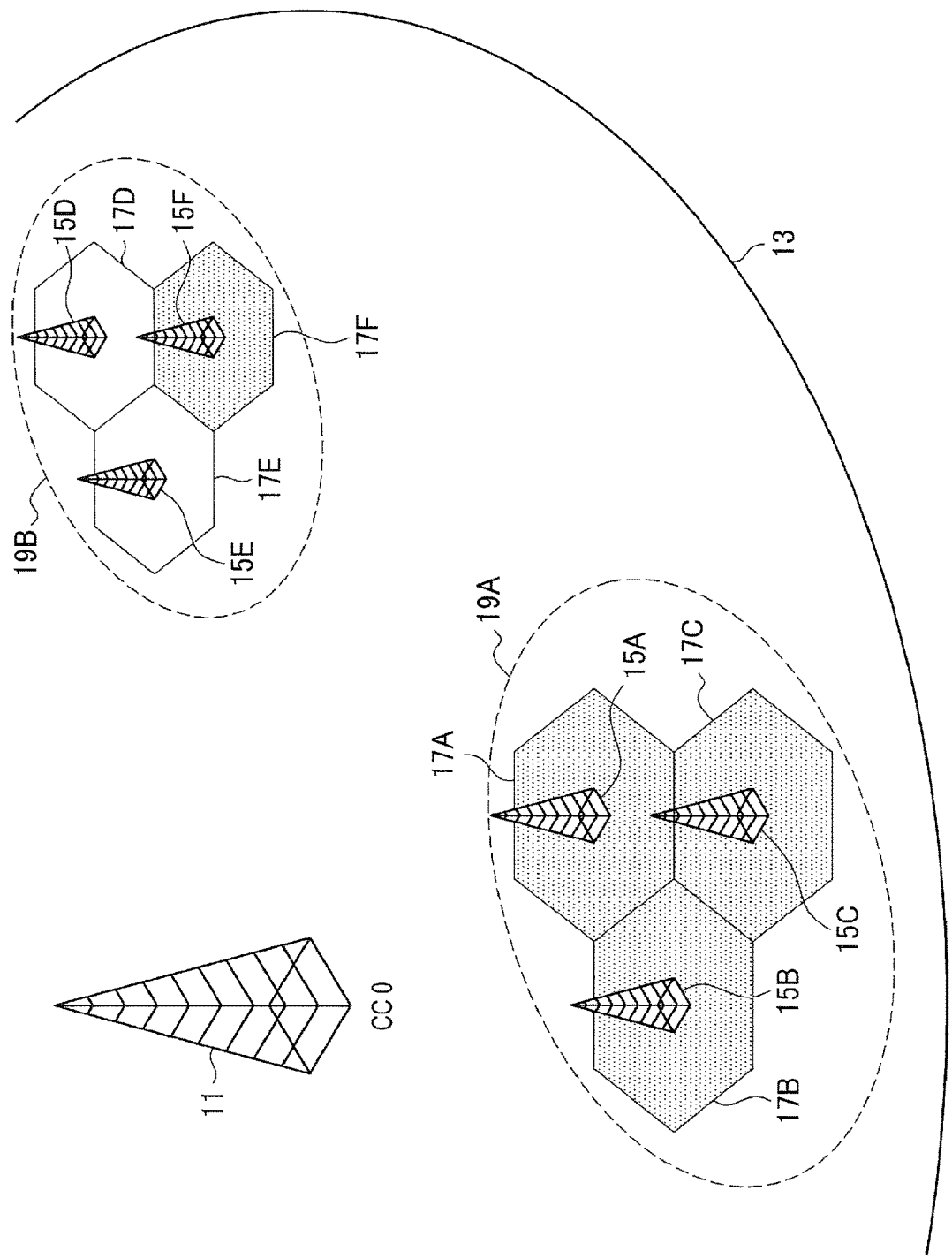
FIG. 9 is an explanatory diagram for describing an example of an on/off state of a small cell.

FIG. 9 is an explanatory diagram for describing an example of the on/off state of a small cell. Referring to FIG. 9, the macro base station 11, the macro cell 13, the small base stations 15A to 15F, the small cells 17A to 17F and terminal devices 21A to 21F are shown. The small cells 17A to 17C are included in a small cell cluster 19A. The small cells 17D to 17F are included in a small cell cluster 19B. For example, in the small cell cluster 19A, since the terminal devices 21A to 21C are located in the small cells 17A to 17C, respectively, the small cells 17A to 17C are switched to the on state. Therefore, in the small cell cluster 19A, interference is not suppressed. On the other hand, in the small cell cluster 19B, since the terminal devices 21D to 21F are concentrated at the small cell 17F, the small cell 17F is switched to the on state, and the small cells 17D and 17E are switched to the off state. Therefore, in the small cell cluster 19B, interference is suppressed.

In the above-described case, for example, when the terminal device is handed over to the macro cell, more small cells can be switched to the off state. However, in such a technique, for example, when a small cell positioned at a cell edge of the macro cell is switched to the off state and the terminal device that was performing communication in the small cell performs communication in the macro cell, communication quality of the terminal device may significantly deteriorate. That is, there is a possibility of a coverage hole being generated when the small cell is switched to the off state.

Therefore, it is preferable to provide a mechanism through which it is possible to reduce interference from the small cell and suppress deterioration of communication quality of the terminal device.

3. FIRST EMBODIMENT

Next, a first embodiment of the present disclosure will be described with reference to FIG. 10 to FIG. 16.

<3.1. Schematic Configuration of Communication System>

Figure 10:
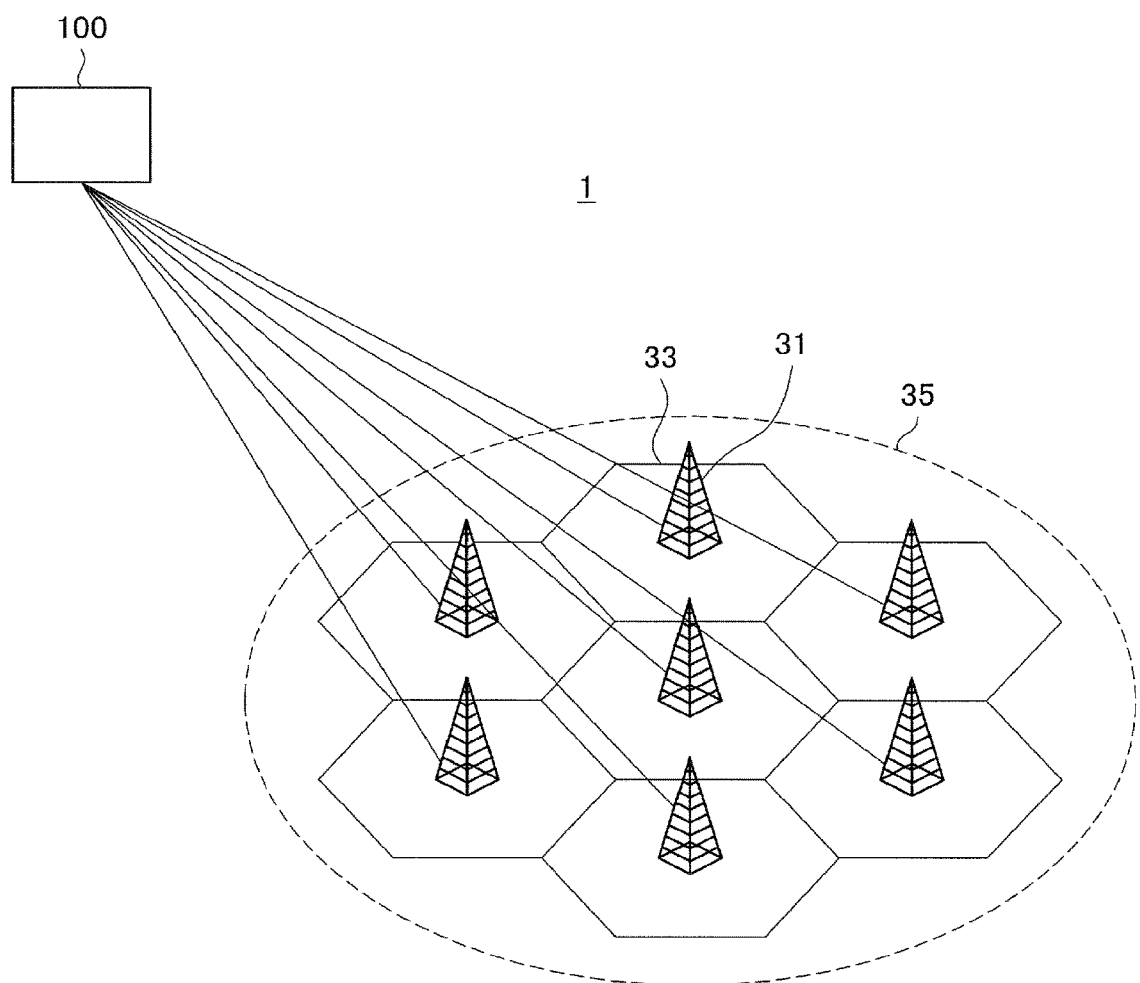
FIG. 10 is an explanatory diagram illustrating an example of a schematic configuration of a communication system according to a first embodiment.

First, a schematic configuration of a communication system 1 according to the first embodiment will be described with reference to FIG. 10. FIG. 10 is an explanatory diagram illustrating an example of a schematic configuration of the communication system 1 according to the first embodiment. As illustrated in FIG. 10, the communication system 1 includes a control entity 100 and a plurality of small base stations 31. The communication system 1 is a system supporting, for example, LTE, LTE-Advanced, or a communication standard equivalent thereto.

The small base station 31 is a base station of a small cell 33. For example, the small cell 33 is included in a small cell cluster 35. For example, the small base station 31 wirelessly communicates with a terminal device. Specifically, for example, the small base station 31 transmits a downlink signal to the terminal device and receives an uplink signal from the terminal device.

The control entity 100 performs control of the small cell 33. The control entity 100 is, for example, an existing or new core network node. Alternatively, the control entity 100 may be a base station.

Specifically, in the first embodiment, the control entity 100 assigns blank subframes in which no signal is transmitted and received to each of the plurality of small cells 33. The control entity 100 assigns the same subframes to one or more small cells 33 that are a part of the plurality of small cells 33 as the blank subframes and does not assign the same subframes to the remaining small cells 33 among the plurality of small cells 33 as the blank subframes. Accordingly, for example, it is possible to suppress deterioration of communication quality of the terminal device while reducing interference from a small cell.

<3.2. Configuration of Control Entity>

Figure 11:
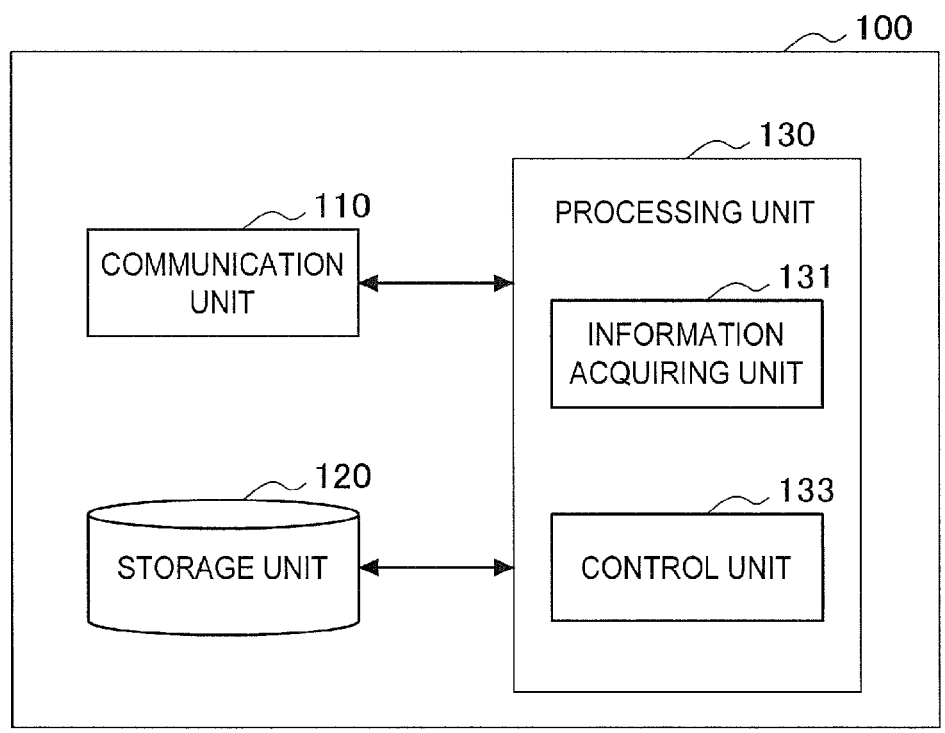
FIG. 11 is a block diagram illustrating an example of a configuration of a control entity according to the first embodiment.

Next, an example of a configuration of the control entity 100 according to the first embodiment will be described with reference to FIG. 11 to FIG. 15. FIG. 11 is a block diagram illustrating an example of a configuration of the control entity 100 according to the first embodiment. As illustrated in FIG. 11, the control entity 100 includes a communication unit 110, a storage unit 120 and a processing unit 130.

(Communication Unit 110)

The communication unit 110 transmits and receives information. For example, the communication unit 110 transmits information to another node and receives information from the other node. For example, the other node includes a core network and a base station. As an example, the other node includes the small base station 31.

(Storage Unit 120)

The storage unit 120 temporarily or permanently stores programs and data for operations of the control entity 100.

(Processing Unit 130)

The processing unit 130 provides various functions of the control entity 100. The processing unit 130 includes an information acquiring unit 131 and a control unit 133. Alternatively, the processing unit 130 may further include a component other than these components. That is, the processing unit 130 may perform an operation other than operations of these components.

(Information Acquiring Unit 131)

The information acquiring unit 131 acquires information about the plurality of small cells 33 (hereinafter referred to as "small cell information").

(a) Small Cell Information

For example, the small cell information includes identification information for identifying each of the small cells 33. More specifically, for example, the identification information is a cell ID of each of the small cells 33. For example, cell IDs of the plurality of small cells 33 are stored in the storage unit 120, and the information acquiring unit 131 acquires a cell ID from the storage unit 120.

For example, the small cell information includes traffic amount information indicating an amount of traffic in each of the plurality of small cells 33. For example, the small base station 31 of each of the plurality of small cells 33 transmits traffic amount information indicating an amount of traffic in the small cell 33 to the control entity 100, and the traffic amount information is stored in the storage unit 120. The information acquiring unit 131 acquires the traffic amount information from the storage unit 120 at any timing thereafter.

The small cell information is not limited to the above-described example. As an example, the small cell information may not include the traffic amount information. As another example, the small cell information may further include another piece of information.

(b) Plurality of Small Cells

For example, the plurality of small cells 33 are a set of adjacent small cells 33. More specifically, for example, the plurality of small cells 33 are small cells 33 that are included in the same small cell cluster 35. The plurality of small cells 33 may be all of the small cells 33 that are included in the small cell cluster 35 or a part of the small cells 33 that are included in the small cell cluster 35.

The plurality of small cells 33 may not be included in the small cell cluster, but may be a simple set of small cells.

(Control Unit 133)

The control unit 133 assigns blank subframes in which no signal is transmitted and received to each of the plurality of small cells 33. The control unit 133 assigns the same subframes to one or more small cells 33 that are a part of the plurality of small cells 33 as the blank subframes, and does not assign the same subframes to the remaining small cells 33 among the plurality of small cells 33 as the blank subframes. Accordingly, for example, interference from the remaining small cells 33 to the one or more small cells 33 may be removed. In addition, when the small cells 33 are not completely switched to the off state and do not transmit a signal in a subframe unit, the terminal device can continue communication in the small cell 33. Therefore, deterioration of communication quality of the terminal device may be suppressed.

(a) Amount of Blank Subframes Assigned to Small Cell (a-1) Assignment Based on Amount of Traffic For example, the control unit 133 assigns blank subframes to each of the plurality of small cells 33 based on an amount of traffic in each of the plurality of small cells 33.

More specifically, for example, the control unit 133 assigns fewer blank subframes to the first small cell 33 having a greater amount of traffic among the plurality of small cells 33 and assigns more blank subframes to the second small cell 33 having a smaller amount of traffic among the plurality of small cells 33. Hereinafter, this will be described with reference to a specific example of FIG. 12.

Figure 12:
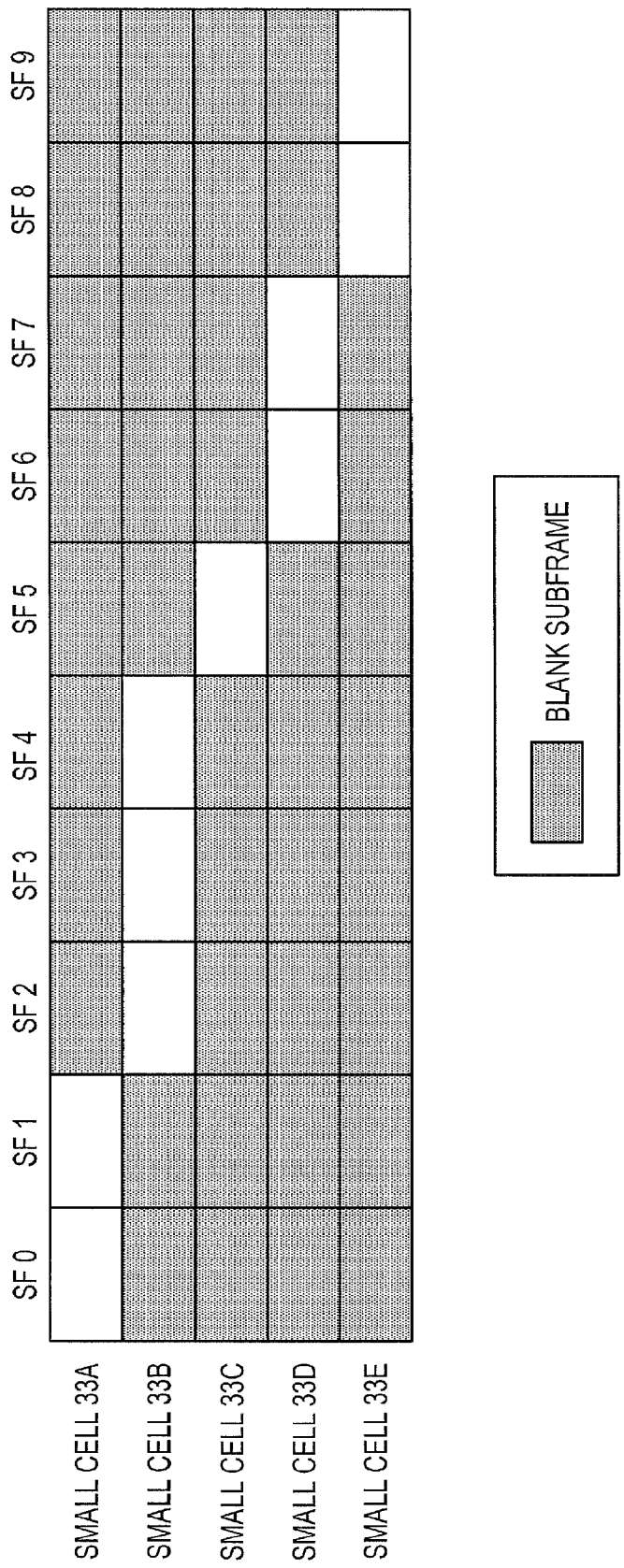
FIG. 12 is an explanatory diagram for describing a first example of assigning blank subframes.

FIG. 12 is an explanatory diagram for describing a first example of assigning blank subframes. As illustrated in FIG. 12, one radio frame (10 subframes) and five small cells 33A to 33E are shown. For example, an amount of traffic in the small cell 33B is greatest and an amount of traffic in the small cell 33C is smallest. Therefore, for example, three subframes (subframes 2 to 4) are assigned to the small cell 33B as blank subframes and one subframe (a subframe 5) is assigned to the small cell 33C as a blank subframe. Two subframes are assigned to each of the small cell 33A, the small cell 33D and the small cell 33E as blank subframes.

Accordingly, for example, it is possible to use more radio resources in the small cell 33 having a greater amount of traffic. Therefore, it is possible to avoid generation of a great amount of delay in the small cell 33 having a great amount of traffic.

(a-2) Equal Assignment

The control unit 133 may equally assign blank subframes to each of the plurality of small cells 33. Hereinafter, this will be described with reference to a specific example of FIG. 13.

Figure 13:
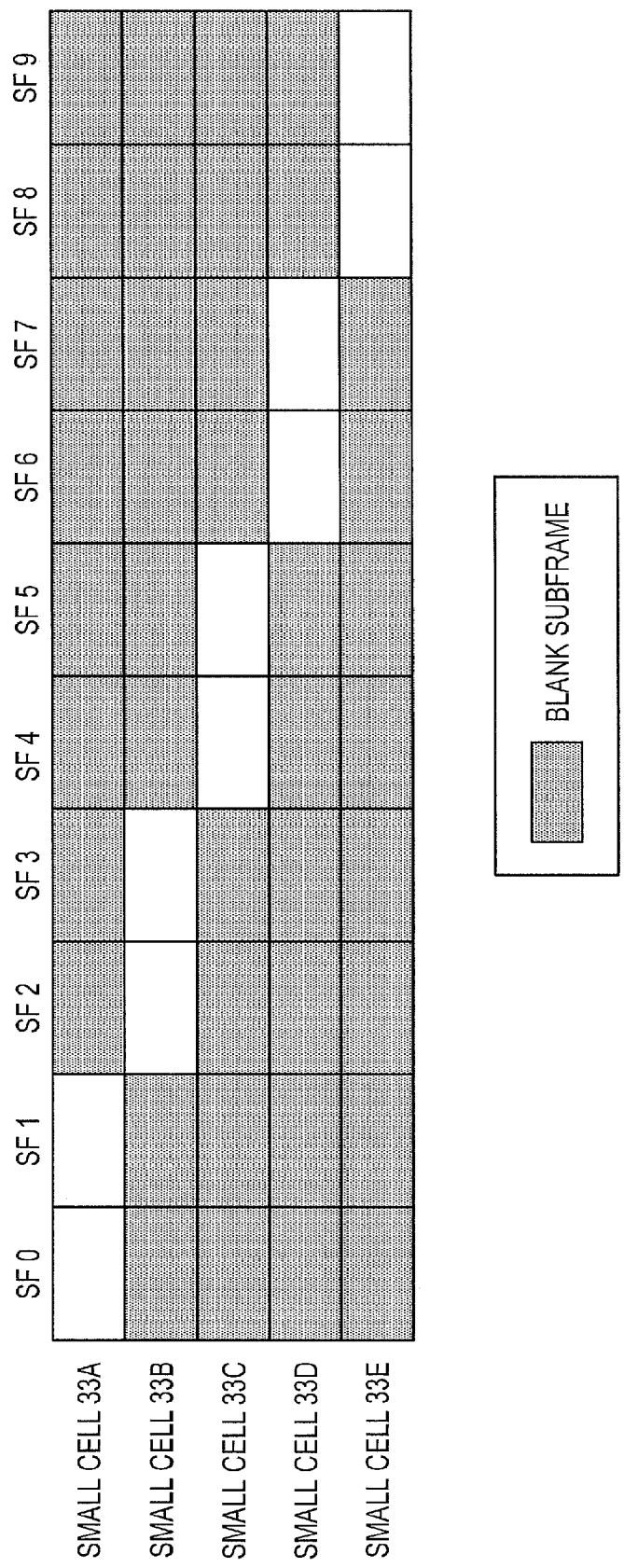
FIG. 13 is an explanatory diagram for describing a second example of assigning blank subframes.

FIG. 13 is an explanatory diagram for describing a second example of assigning blank subframes. As illustrated in FIG. 13, one radio frame (10 subframes) and five small cells 33A to 33E are shown. For example, regardless of an amount of traffic in each of the small cells 33A to 33E, two subframes are assigned to each of the small cells 33A to 33E as blank subframes.

Accordingly, for example, it is possible to assign blank subframes without collecting information about the small cell 33. That is, assigning blank subframes may be performed more easily.

(b) Transmission of Signal in Same Subframes (b-1) Case in which Transmission of Signal is Possible in One Small Cell For example, the control unit 133 assigns the same subframes to small cells excluding one small cell among the plurality of small cells as the blank subframes and does not assign the same subframes to the one small cell as the blank subframes. That is, in the same subframes, a signal is transmitted only in one small cell.

For example, referring again to FIG. 12, each subframe is assigned only to one small cell 33. In addition, referring again to FIG. 13, each subframe is assigned only to one small cell 33.

Accordingly, for example, interference between the plurality of small cells 33 may be removed.

(b-2) Case in which Transmission of Signal is Possible in Two or More Small Cells The control unit 133 assigns each of at least one subframe to small cells excluding two or more small cells among the plurality of small cells as the blank subframe, and may not assign each of at least one subframe to the two or more small cells as the blank subframe. That is, in at least one subframe, a signal may be transmitted in two or more small cells. Hereinafter, this will be described with reference to a specific example of FIG. 14.

Figure 14:
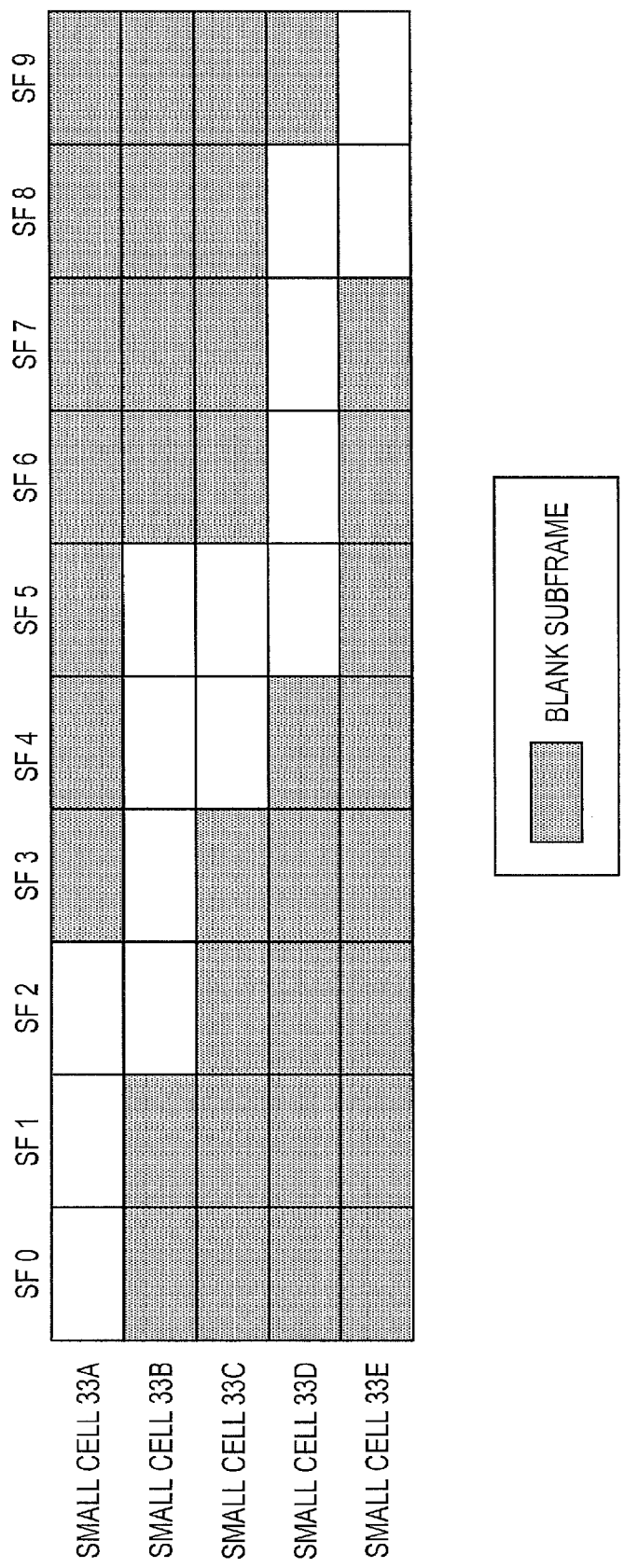
FIG. 14 is an explanatory diagram for describing a third example of assigning blank subframes.

FIG. 14 is an explanatory diagram for describing a third example of assigning blank subframes. As illustrated in FIG. 14, one radio frame (10 subframes) and five small cells 33A to 33E are shown. For example, a subframe 2 is assigned to two small cells (the small cells 33A and 33B) as a blank subframe. In addition, a subframe 4 is assigned to two small cells (the small cells 33B and 33C) as a blank subframe. In addition, a subframe 5 is assigned to three small cells (the small cells 33B, 33C and 33D) as a blank subframe. A subframe 8 is assigned to two small cells (the small cells 33D and 33E) as a blank subframe.

Accordingly, for example, more opportunities to transmit a signal are provided in the individual small cell 33. As a result, throughput may be improved.

(c) No Assignment of Specific Subframe

The control unit 133 may not assign a specific subframe to any of the small cells 33 as the blank subframe.

For example, the specific subframe may be a subframe in which a synchronization signal (SS) is transmitted. Hereinafter, this will be described with reference to a specific example of FIG. 15.

Figure 15:
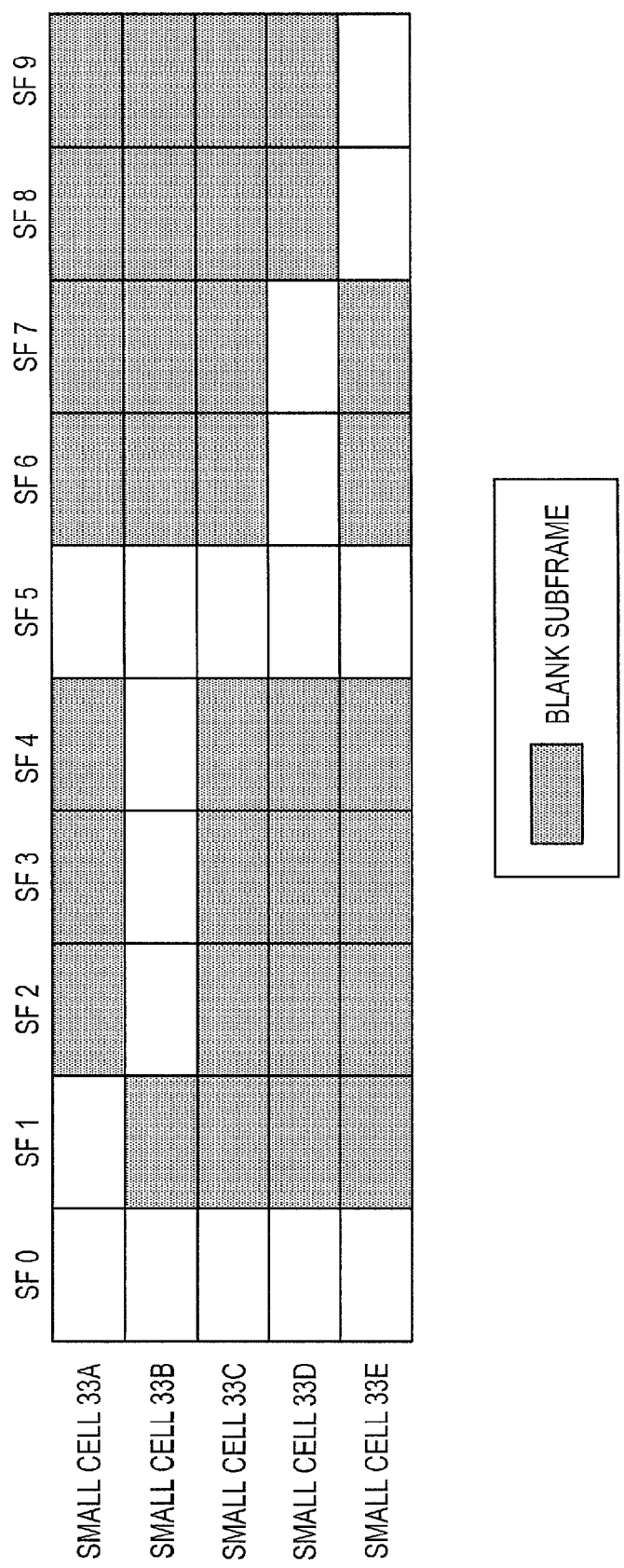
FIG. 15 is an explanatory diagram for describing a fourth example of assigning blank subframes.

FIG. 15 is an explanatory diagram for describing a fourth example of assigning blank subframes. As illustrated in FIG. 15, one radio frame (10 subframes) and five small cells 33A to 33E are shown. For example, since a synchronization signal is transmitted in a subframe 0 and a subframe 5, the subframe 0 and the subframe 5 are not assigned to any of the small cells 33 as blank subframes. On the other hand, the other subframes are assigned as blank subframes.

Accordingly, for example, the terminal device can be synchronized in the small cell 33.

For example, as described above, the control unit 133 assigns the blank subframes to each of the plurality of small cells. For example, the control unit 133 notifies the small base station 31 of each of the plurality of small cells 33 of the assigned blank subframes. Accordingly, the small base station 31 may apply the assigned blank subframes. As a result, interference between the small cells 33 may be suppressed.

<3.3. Process Flow>

Next, an example of a process according to the first embodiment will be described with reference to FIG. 16.

Figure 16:
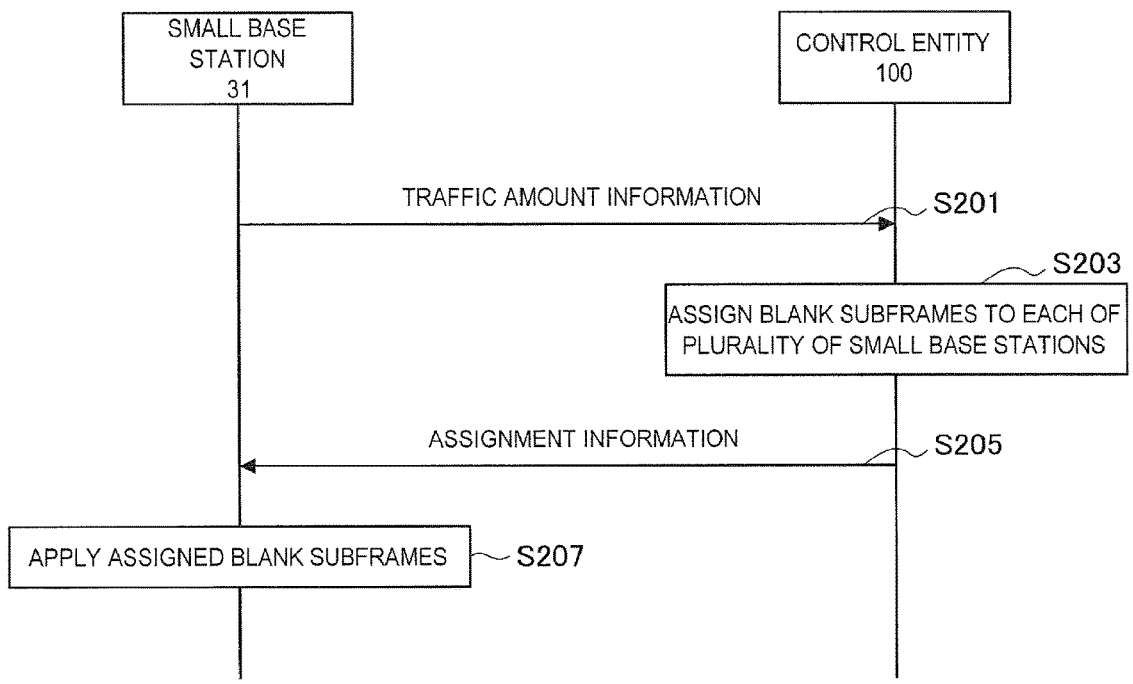
FIG. 16 is a sequence diagram illustrating an example of a schematic flow of a process according to the first embodiment.

FIG. 16 is a sequence diagram illustrating an example of a schematic flow of a process according to the first embodiment.

The small base station 31 transmits traffic amount information indicating an amount of traffic in the small cell 33 to the control entity 100 (S201).

The control entity 100 (the control unit 133) assigns blank subframes in which no signal is transmitted and received to each of the plurality of small cells 33 (S203). For example, the control entity 100 assigns the blank subframes to each of the plurality of small cells 33 based on an amount of traffic in each of the plurality of small cells 33.

The control entity 100 (the control unit 133) notifies the small base station 31 of each of the plurality of small cells 33 of the assigned blank subframes (S205).

The small base station 31 applies the assigned blank subframes (S207). As a result, for example, the small base station 31 does not transmit and receive a signal in the assigned blank subframes.

The control entity 100 may perform the above process, for example, for each set of a plurality of small cells.

(Other Variations)

The control entity 100 may assign the blank subframes to each of the plurality of small cells 33 regardless of the amount of traffic. In this case, the traffic amount information may not be transmitted to the control entity 100 by the small base station 31. As an example, the control entity 100 may equally assign the blank subframes to each of the plurality of small cells 33.

In addition, the small base station 31 may transmit another piece of information to the control entity 100 instead of the traffic amount information or along with the traffic amount information. For example, the small base station 31 may transmit information indicating an association of the terminal device and/or a packet arrival to the control entity 100.

In addition, the control entity 100 may decide to switch the on/off state of the small cell.

4. SECOND EMBODIMENT

Next, a second embodiment of the present disclosure will be described with reference to FIG. 17 to FIG. 21.

<4.1. Schematic Configuration of Communication System>

Figure 17:
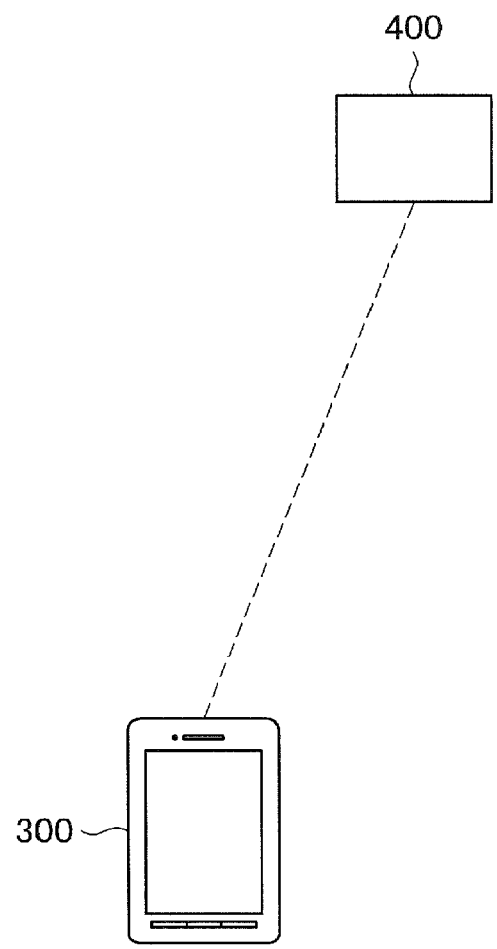
FIG. 17 is an explanatory diagram illustrating an example of a schematic configuration of a communication system according to a second embodiment.

First, a schematic configuration of a communication system 2 according to the second embodiment will be described with reference to FIG. 17. FIG. 17 is an explanatory diagram illustrating an example of a schematic configuration of the communication system 2 according to the second embodiment. As illustrated in FIG. 17, the communication system 2 includes a terminal device 300 and a control entity 400.

The terminal device 300 wirelessly communicates with a base station. For example, the terminal device 300 receives a downlink signal from the base station and transmits an uplink signal to the base station.

The control entity 400 performs control of a small cell. The control entity 400 is, for example, an existing or new core network node. Alternatively, the control entity 400 may be the base station.

Specifically, in the second embodiment, the control entity 400 decides to switch the small cell from the on state to the off state. The terminal device 300 acquires information indicating the decision of switching the small cell from the on state to the off state and requests that the switching be canceled. The control entity 400 cancels the switching in response to the request to cancel the switching. Accordingly, for example, it is possible to suppress deterioration of communication quality of the terminal device while reducing interference from the small cell.

<4.2. Configuration of Terminal Device>

Figure 18:
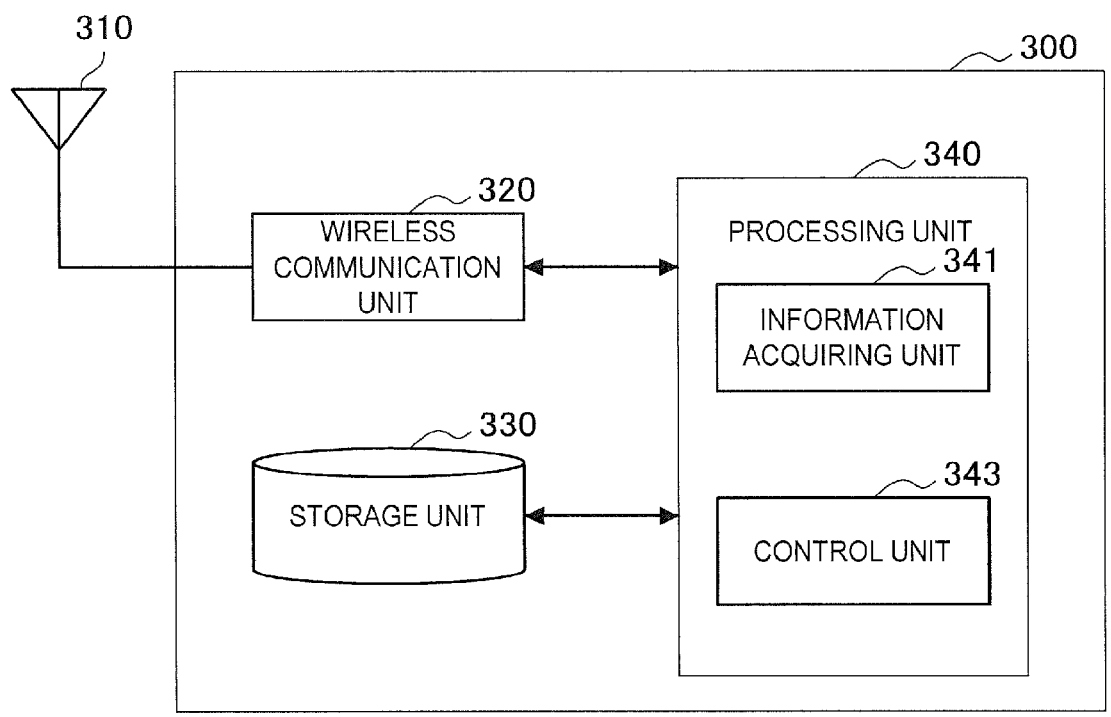
FIG. 18 is a block diagram illustrating an example of a configuration of a terminal device according to a second embodiment.

Next, an example of a configuration of the terminal device 300 according to the second embodiment will be described with reference to FIG. 18. FIG. 18 is a block diagram illustrating an example of a configuration of the terminal device 300 according to the second embodiment. As illustrated in FIG. 18, the terminal device 300 includes an antenna unit 310, a wireless communication unit 320, a storage unit 330 and a processing unit 340.

(Antenna Unit 310)

The antenna unit 310 emits a signal to be output by the wireless communication unit 320 into space as radio waves. In addition, the antenna unit 310 converts the spatial radio waves into a signal and outputs the signal to the wireless communication unit 320.

(Wireless Communication Unit 320)

The wireless communication unit 320 transmits and receives signals. For example, the wireless communication unit 320 receives a downlink signal from the base station and transmits an uplink signal to the base station.

(Storage Unit 330)

The storage unit 330 temporarily or permanently stores programs and data for operations of the terminal device 300.

(Processing Unit 340)

The processing unit 340 provides various functions of the terminal device 300. The processing unit 340 includes an information acquiring unit 341 and a control unit 343. Alternatively, the processing unit 340 may further include a component other than these components. That is, the processing unit 340 may perform an operation other than operations of these components.

(Information Acquiring Unit 341)

The information acquiring unit 341 acquires information indicating the decision of switching the small cell from the on state to the off state (hereinafter referred to as "switching information").

(a) Small Cell

For example, the small cell is a serving cell. Further, when the terminal device 300 supports, for example, carrier aggregation, the small cell is, for example, a primary cell of carrier aggregation.

The small cell is not limited to the above-described example. For example, the small cell may be a secondary cell rather than the primary cell. Alternatively, the small cell may be a cell (for example, a neighbor cell) other than the serving cell.

(b) On/Off State

For example, the "on state" of a small cell is a state in which a base station of the small cell transmits and receives signals (a data signal and a control signal) in the small cell.

For example, the "off state" of a small cell is a state in which a base station of the small cell does not transmit and receive signals except some control signals (for example, a DRS) in the small cell. Alternatively, the "off state" of a small cell may be a state in which a base station of the small cell does not transmit and receive signals in the small cell at all.

(c) Specific Technique

For example, the control entity 400 transmits the switching information to the terminal device 300 through a serving base station of the terminal device 300 when the switching is decided. Specifically, for example, the control entity 400 transmits a message of an upper layer (for example, Non-Access Stratum (NAS)) including the switching information to the terminal device 300. Alternatively, the control entity 400 may transmit the switching information to the serving base station of the terminal device 300, and the base station may transmit the switching information to the terminal device 300. The switching information is received by the terminal device 300 and is stored in the storage unit 330. The information acquiring unit 341 acquires the switching information from the storage unit 330 at any timing thereafter.

(Control Unit 343)

The control unit 343 requests that the switching be canceled (that is, the switching of the small cell from the on state to the off state).

(a) Predetermined Condition

For example, when a predetermined condition regarding a result of measurement performed by the terminal device 300 is satisfied, the control unit 343 requests the cancellation. Accordingly, for example, a request for cancellation is suppressed. Therefore, the small cell is switched to the off state, and interference from the small cell may be reduced.

For example, the predetermined condition is a condition that a measurement result of the small cell be more favorable than a first threshold and a measurement result of each of the other cells be less favorable than a second threshold.

More specifically, for example, the measurement result is reference signal received power (RSRP) or reference signal received quality (RSRQ). In addition, the predetermined condition is a condition that a measurement result of the small cell be greater than the first threshold and a measurement result of the other cells be smaller than the second threshold. That is, the predetermined condition is a condition that communication quality of the small cell be favorable and communication quality of the other cells be unfavorable.

Accordingly, for example, when the small cell is switched to the off state and thus communication quality of the terminal device 300 is assumed to be unfavorable, the switching may be cancelled. Therefore, deterioration of communication quality of the terminal device 300 may be suppressed.

The other cells include, for example, a macro cell and other small cells.

(b) Specific Technique

For example, the control unit 343 transmits a cancellation request message for requesting the cancellation through the antenna unit 310 and the wireless communication unit 320.

For example, the control unit 343 transmits the cancellation request message to the control entity 400 through the serving base station. Alternatively, the control unit 343 transmits the cancellation request message to the serving base station, and the serving base station may transmit the cancellation request message or a message similar thereto to the control entity 400.

As described above, the cancel is requested. Accordingly, for example, the small cell maintains the on state without switching to the off state as necessary. Therefore, deterioration of communication quality of the terminal device 300 may be suppressed. In addition, interference from the small cell may be suppressed according to the switching of the on/off state of the small cell.

<4.3. Configuration of Control Entity>

Figure 19:
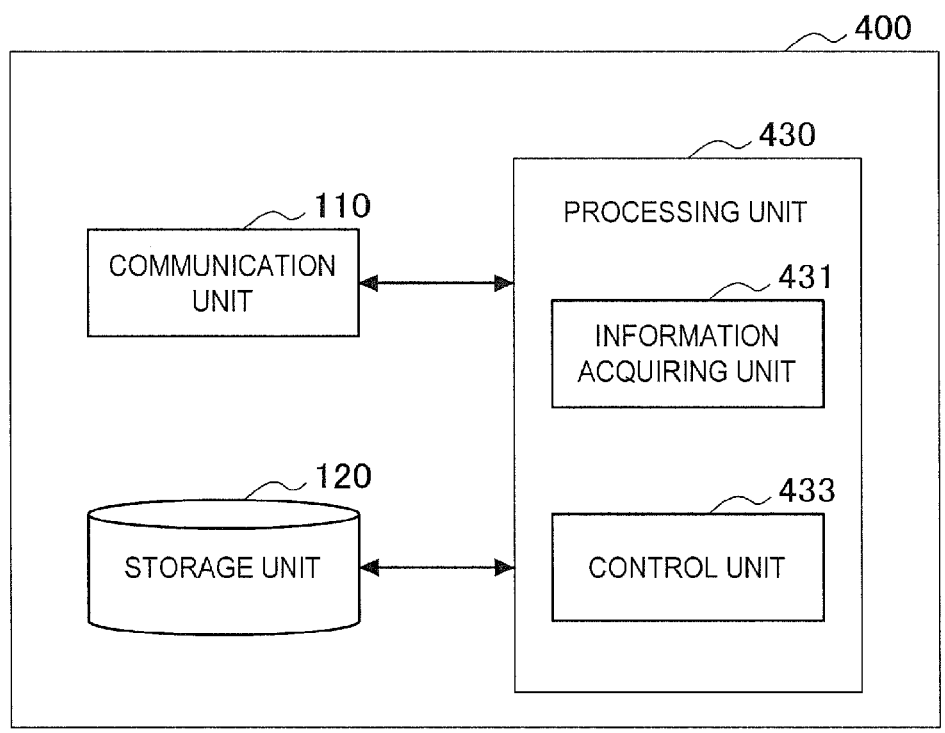
FIG. 19 is a block diagram illustrating an example of a configuration of a control entity according to the second embodiment.

Next, an example of a configuration of the control entity 400 according to the second embodiment will be described with reference to FIG. 19. FIG. 19 is a block diagram illustrating an example of a configuration of the control entity 400 according to the second embodiment. As illustrated in FIG. 19, the control entity 400 includes a communication unit 410, a storage unit 420 and a processing unit 430.

(Communication Unit 410)

The communication unit 410 transmits and receives information. For example, the communication unit 410 transmits information to another node and receives information from the other node. For example, the other node includes a core network, a base station and a terminal device. As an example, the other node includes a small base station and the terminal device 300.

(Storage Unit 420)

The storage unit 420 temporarily or permanently stores programs and data for operations of the control entity 400.

(Processing Unit 430)

The processing unit 430 provides various functions of the control entity 400. The processing unit 430 includes an information acquiring unit 431 and a control unit 433. Alternatively, the processing unit 430 may further include a component other than these components. That is, the processing unit 430 may perform an operation other than operations of these components.

(Information Acquiring Unit 431)

(a) Request to Cancel

The information acquiring unit 431 acquires a request to cancel switching of the small cell from the on state to the off state.

For example, the request refers to a cancellation request message for requesting the cancel. For example, the cancellation request message is transmitted to the control entity 400 by the terminal device 300. Alternatively, the cancellation request message may be transmitted to the control entity 400 by the base station according to a request from the terminal device 300.

(b) Small Cell Information

For example, the information acquiring unit 431 acquires information about a small cell (hereinafter referred to as "small cell information").

For example, the small cell information includes information indicating a cell ID of a small cell, an amount of traffic in a small cell, a cell association of a terminal device and/or a packet arrival.

For example, a small base station of the small cell transmits the small cell information to the control entity 400, and the control entity 400 receives the small cell information. Then, the small cell information is stored in the storage unit 420. The information acquiring unit 431 acquires the small cell information at any timing thereafter.

(Control Unit 433)

(a) Decision of Switching

The control unit 433 decides to switch the on/off state of the small cell.

For example, the control unit 433 decides to switch the small cell from the on state to the off state. Specifically, for example, the control unit 433 decides the switching based on the small cell information.

Further, for example, the control unit 433 notifies the terminal device 300 of the decided switching. For example, the control unit 433 transmits information indicating the decided switching (that is, switching information) to the terminal device 300 through the serving base station of the terminal device 300 when the switching is decided. Specifically, for example, the control unit 433 transmits a message of an upper layer (for example, NAS) including the switching information to the terminal device 300 through the serving base station. Alternatively, the control unit 433 transmits the switching information to the serving base station of the terminal device 300, and the serving base station may transmit the switching information (or information similar thereto) to the terminal device 300.

(b) Cancellation of Switching

The control unit 433 cancels the switching in response to the request.

For example, the terminal device 300 transmits a cancellation request message for requesting the cancellation. Then, the control unit 433 cancels the switching according to the cancellation request message.

<4.4. Process Flow>

Next, an example of a process according to the second embodiment will be described with reference to FIG. 20 and FIG. 21.

(Overall Process Flow)

Figure 20:
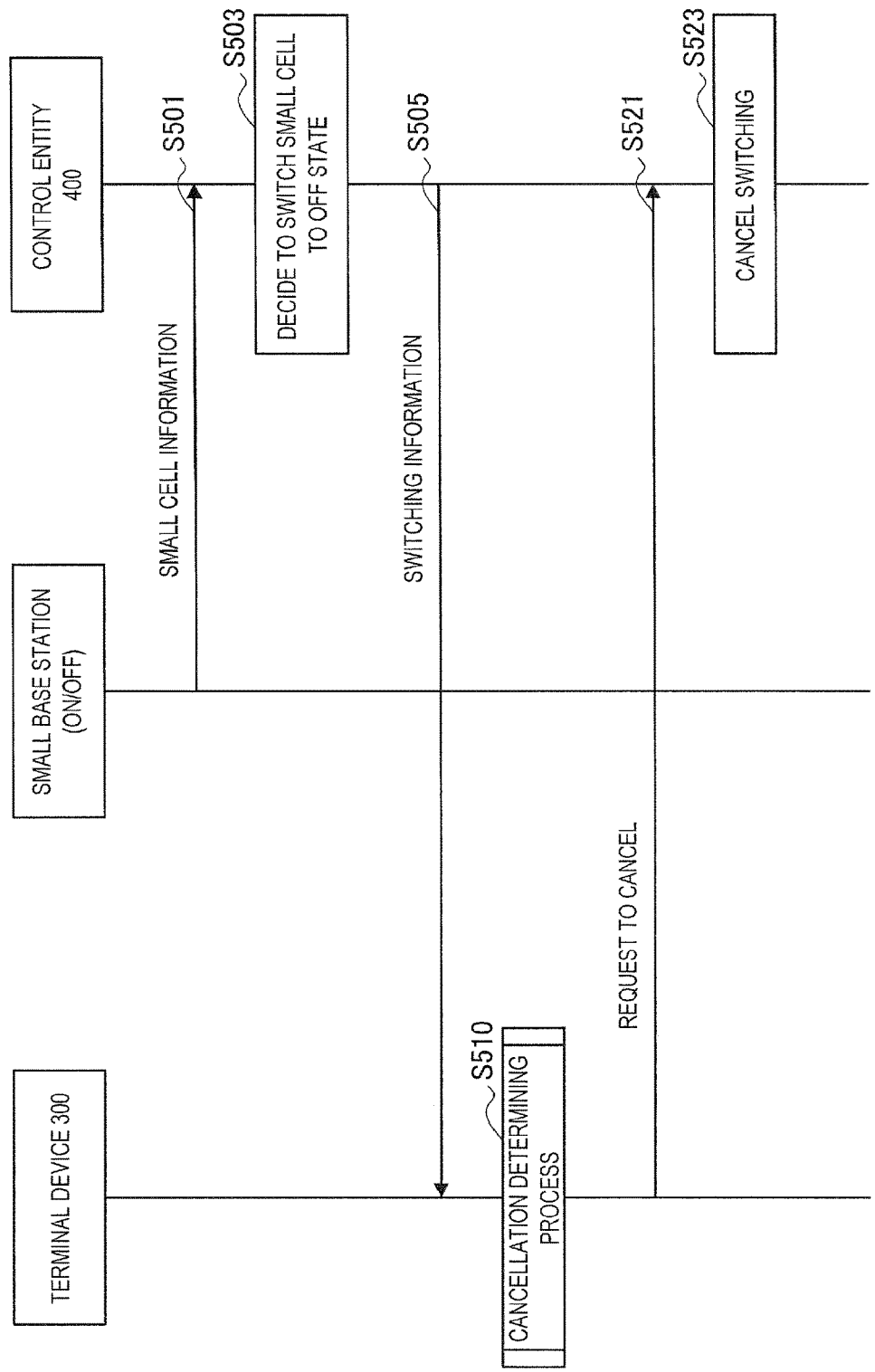
FIG. 20 is a sequence diagram illustrating an example of a schematic flow of a process according to the second embodiment.

FIG. 20 is a sequence diagram illustrating an example of a schematic flow of a process according to the second embodiment.

A small base station transmits information about a small cell (that is, small cell information) to a control entity 500 (S501).

The control entity 400 (the control unit 433) decides to switch the small cell from the on state to the off state (S503). For example, the control entity 400 decides the switching based on the small cell information.

Then, the control entity 400 (the control unit 433) notifies the terminal device 300 of the decided switching (S505).

Then, the terminal device 300 (the control unit 343) performs a cancellation determining process (S510). That is, the terminal device 300 determines whether to request that the switching be canceled. Specifically, for example, the terminal device 300 determines whether a predetermined condition regarding a result of measurement performed by the terminal device 300 is satisfied. Then, for example, the terminal device 300 determines to request that the switching be canceled.

The terminal device 300 (the control unit 343) requests that the switching be canceled (that is, switching of the small cell from the on state to the off state) (S521).

Then, the control entity 400 (the control unit 431) cancels the switching (S523).

(Cancellation Determining Process)

Figure 21:
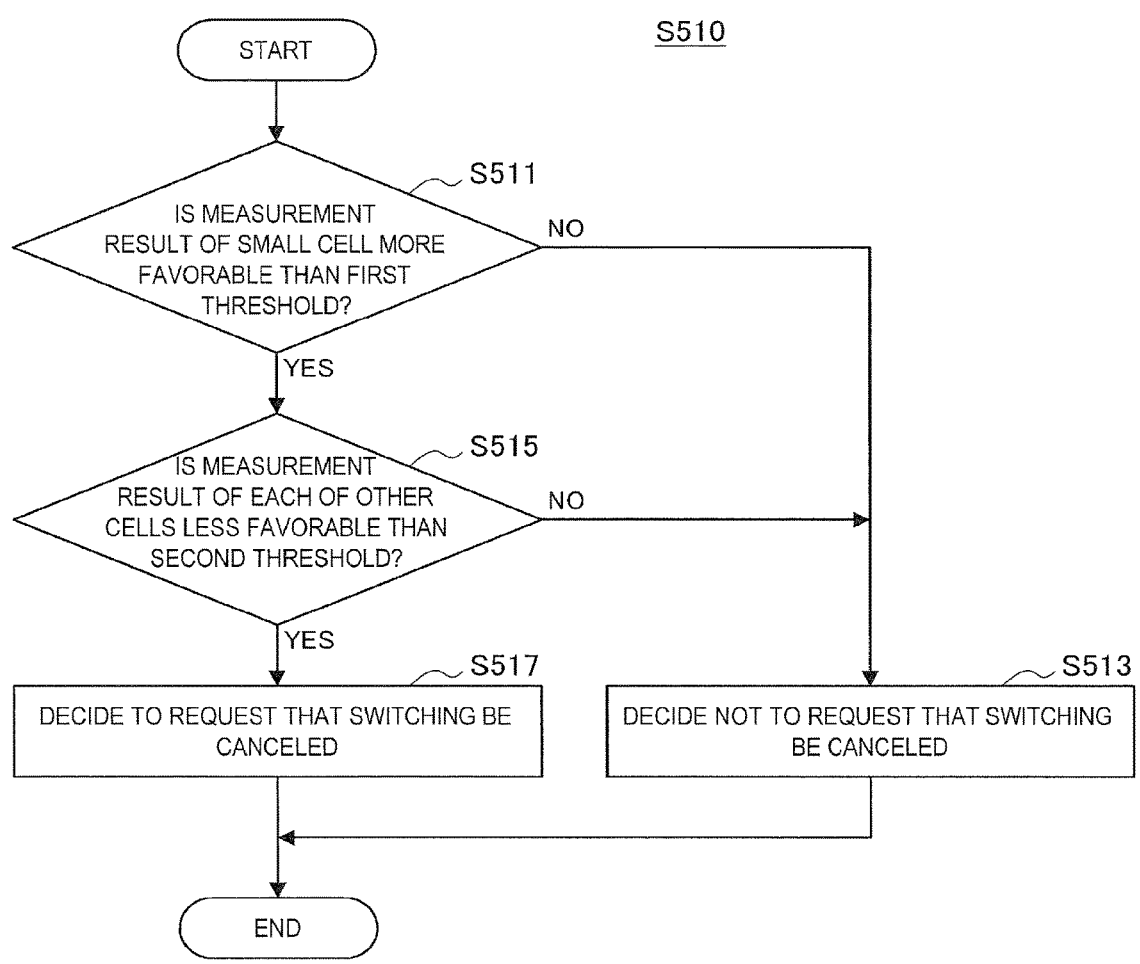
FIG. 21 is a sequence diagram illustrating an example of a schematic flow of a cancellation determining process according to the second embodiment.

FIG. 21 is a sequence diagram illustrating an example of a schematic flow of a cancellation determining process according to the second embodiment.

The control unit 343 determines whether a measurement result of a small cell is more favorable than the first threshold (S511).

When the measurement result is less favorable than the first threshold (NO in S511), the control unit 343 decides not to request that switching be canceled (S513). Then, the process ends.

On the other hand, when the measurement result is more favorable than the first threshold (YES in S511), the control unit 343 determines whether a measurement result of each of the other cells is less favorable than the second threshold (S515).

When the measurement result is less unfavorable than the second threshold (NO in S515), the control unit 343 decides not to request that switching be canceled (S513). Then, the process ends.

On the other hand, when the measurement result is less favorable than the second threshold (YES in S515), the control unit 343 decides to request that switching be canceled (S517). Then, the process ends.

5. APPLICATION EXAMPLES

The technology according to the present disclosure is applicable to various products. For example, the control entity (that is, the control entity 100 or the control entity 400) may be implemented as any type of server such as a tower server, a rack server or a blade server. In addition, at least a part of components of the control entity may be implemented in a module (for example, an integrated circuit module that includes a single die or a card or a blade that is inserted into a slot of a blade server) mounted in a server.

The control entity (i.e., the control entity 100 or the control entity 400) may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the control entity may be implemented as another type of base station such as Nodes B or base transceiver stations (BTSs). The control entity may include the main apparatus (which is also referred to as base station apparatus) that controls wireless communication and one or more remote radio heads (RRHs) that are disposed at different locations from that of the main apparatus. Further, various types of terminals as will be discussed later may temporarily or semi-persistently execute the base station function to operate as the control entity. Further, at least part of components of the control entity may be implemented in a base station device or a module for the base station device.

The terminal device 300 may be implemented as a mobile terminal such as smartphones, tablet personal computers (PCs), notebook PCs, portable game terminals, portable/dongle mobile routers, and digital cameras, or an in-vehicle terminal such as car navigation apparatuses. The terminal device 300 may also be implemented as a terminal (which is also referred to as machine type communication (MTC) terminal) that performs machine to machine (M2M) communication. Furthermore, at least part of components of the terminal device 300 may be implemented as a module (e.g. integrated circuit module constituted with a single die) that is mounted on these terminals.

<5.1. Application Examples for Control Entity>

First Application Example

Figure 22:
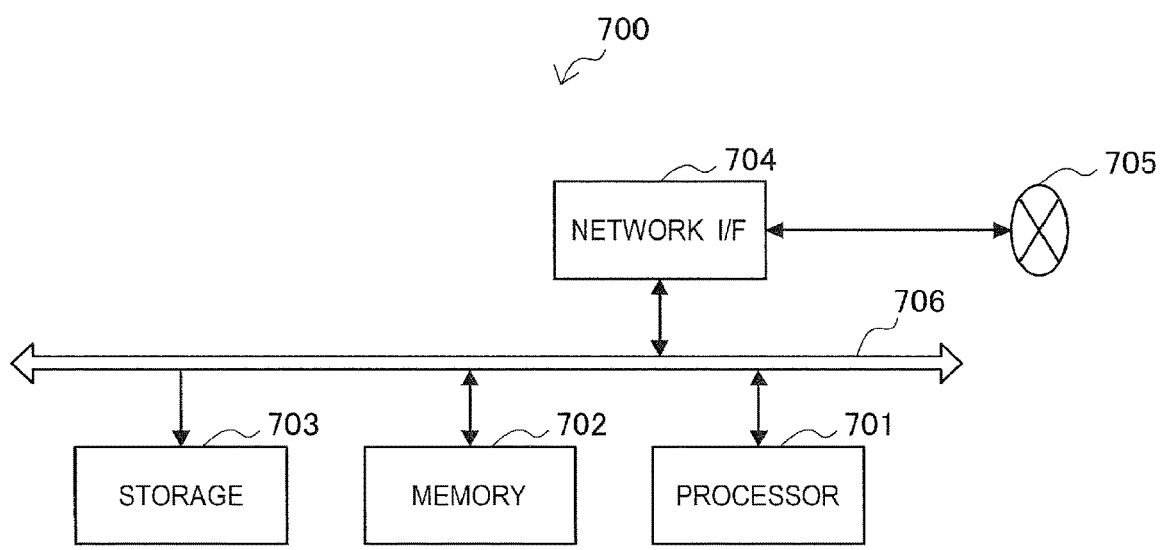
FIG. 22 is a block diagram illustrating an example of a schematic configuration of a server.

FIG. 22 is a block diagram illustrating an example of a schematic configuration of a server 700 to which the technology according to the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls various functions of the server 700. The memory 702 includes a random access memory (RAM) and a read only memory (ROM), and stores a program executed by the processor 701 and data. The storage 703 can include a storage medium such as semiconductor memories and hard disks.

The network interface 704 is a wired communication interface for connecting the server 700 to a wired communication network 705. The wired communication network 705 may be a core network such as evolved packet cores (EPCs), or a packet data network (PDN) such as the Internet.

The bus 706 connects the processor 701, the memory 702, the storage 703, and the network interface 704 to each other. The bus 706 may include two or more buses each having different speed (e.g. high speed bus and low speed bus).

In the server 700 illustrated in FIG. 22, one or more components (the information acquiring unit 131 and/or the control unit 133) included in the processing unit 130 described above with reference to FIG. 11 may be mounted in the processor 701. As an example, a program causing the processor to function as one or more of the components above (that is, a program causing the processor to perform the operation of one or more of the components above) may be installed in the server 700, and the processor 701 may execute the program. As another example, the server 700 may include a module including the processor 701 and the memory 702, and one or more of the components above may be mounted in the module. In this case, the module may store the program causing the processor to function as one or more of the components above in the memory 702, and the program may be executed by the processor 701. As described above, the server 700 or the module may be provided as an apparatus including one or more of the components above, and the program causing the processor to function as one or more of the components above may be provided. A readable recording medium in which the program is recorded may be provided. For these points, one or more components (the information acquiring unit 431 and/or the control unit 433) included in the processing unit 430 described with reference to FIG. 19 are similar to the one or more components included in the processing unit 130.

Second Application Example

Figure 23:
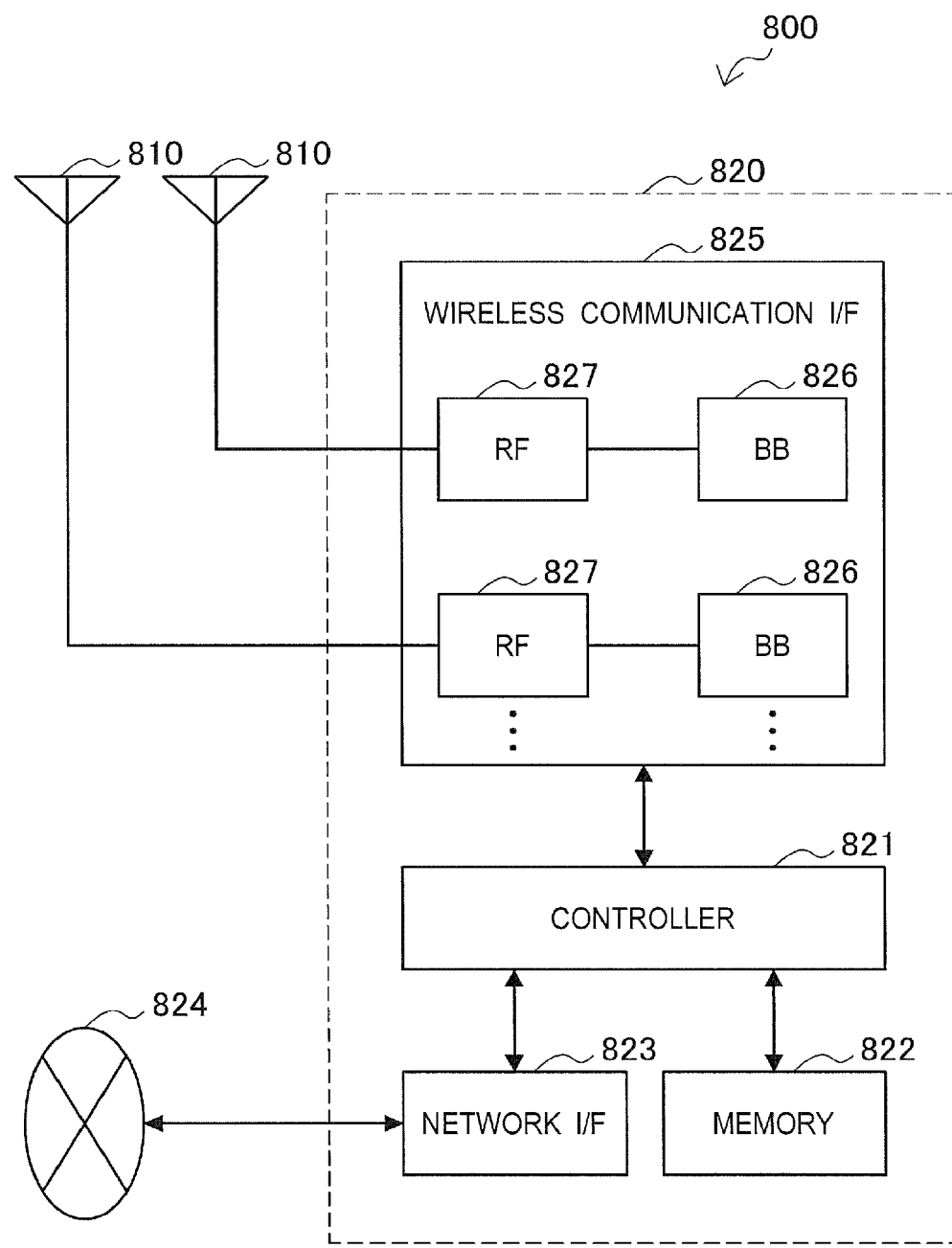
FIG. 23 is a block diagram illustrating a first example of a schematic configuration of an eNB.

FIG. 23 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 23, and the plurality of antennas 810 may, for example, correspond to a plurality of frequency bands used by the eNB 800. It should be noted that while FIG. 23 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the controller 821 may be mutually connected to the eNB 800 and a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as discussed above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 23, and the plurality of BB processors 826 may, for example, correspond to a plurality of frequency bands used by the eNB 800. The wireless communication interface 825 may also include a plurality of the RF circuits 827, as illustrated in FIG. 23, and the plurality of RF circuits 827 may, for example, correspond to a plurality of antenna elements. FIG. 23 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 23, one or more components included in the processing unit 130 described above with reference to FIG. 11 (the information acquiring unit 131 and/or the control unit 133) may be mounted in the controller 821. Alternatively, at least some of the components may be mounted in the wireless communication interface 825. As an example, the eNB 800 may be equipped with a module including some or all components of the wireless communication interface 825 (for example, the BB processor 826) and/or the controller 821, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the eNB 800, and the wireless communication interface 825 (for example, the BB processor 826) and/or the controller 821 may execute the program. As described above, the eNB 800, the base station apparatus 820, or the module may be provided as an apparatus including one or more of the components above, and the program causing the processor to function as one or more of the components above may be provided. A readable recording medium in which the program is recorded may be provided. For these points, one or more components included in the processing unit 430 described above with reference to FIG. 19 (the information acquiring unit 431 and/or the control unit 433) are the same as one or more of the components above included in the processing unit 130.

Third Application Example

Figure 24:
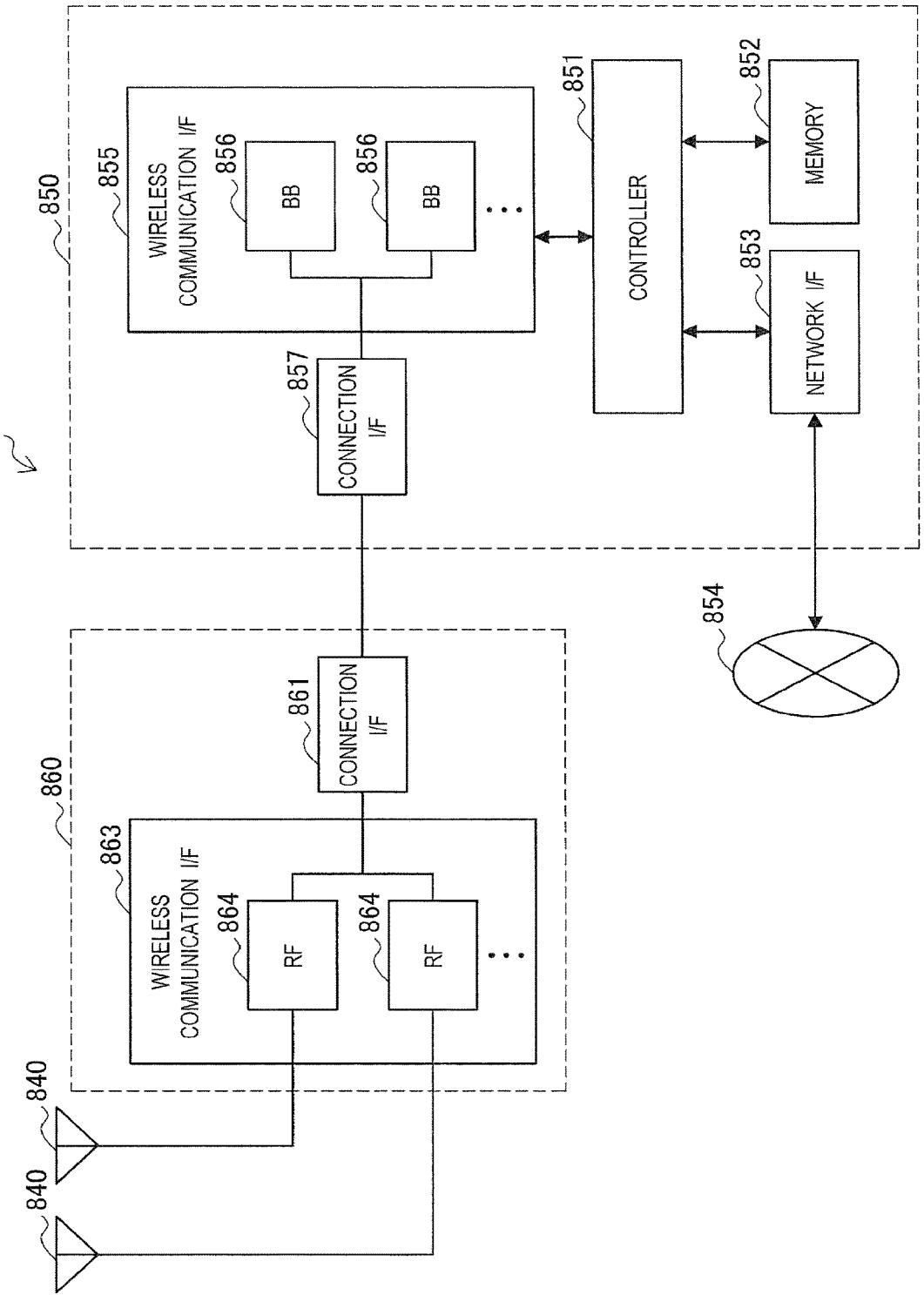
FIG. 24 is a block diagram illustrating a second example of the schematic configuration of the eNB.

FIG. 24 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements constituting a MIMO antenna), and is used for the RRH 860 to transmit and receive a wireless signal. The eNB 830 may include a plurality of the antennas 840 as illustrated in FIG. 24, and the plurality of antennas 840 may, for example, correspond to a plurality of frequency bands used by the eNB 830. FIG. 24 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 23.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 23 except that the BB processor 856 is connected to an RF circuit 864 of the RRH 860 via the connection interface 857. The wireless communication interface 855 may include a plurality of the BB processors 856, as illustrated in FIG. 24, and the plurality of BB processors 856 may, for example, correspond to a plurality of frequency bands used by the eNB 830 respectively. FIG. 24 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 24, and the plurality of RF circuits 864 may, for example, correspond to a plurality of antenna elements. FIG. 24 illustrates an example in which the wireless communication interface 863 includes the plurality of RF circuits 864, but the wireless communication interface 863 may include the single RF circuit 864.

In the eNB 830 illustrated in FIG. 24, one or more components included in the processing unit 130 described above with reference to FIG. 11 (the information acquiring unit 131 and/or the control unit 133) may be mounted in the controller 851. Alternatively, at least some of the components may be mounted in the wireless communication interface 855 and/or the wireless communication interface 863. As an example, the eNB 830 may be equipped with a module including some or all components of the wireless communication interface 855 (for example, the BB processor 856) and/or the controller 851, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the eNB 830, and the wireless communication interface 855 (for example, the BB processor 856) and/or the controller 851 may execute the program. As described above, the eNB 830, the base station apparatus 850, or the module may be provided as an apparatus including one or more of the components above, and the program causing the processor to function as one or more of the components above may be provided. A readable recording medium in which the program is recorded may be provided. In these points, one or more components included in the processing unit 430 described above with reference to FIG. 19 (the information acquiring unit 431 and/or the control unit 433) are the same as one or more of the components above included in the processing unit 130.

<5.2. Application Examples for Terminal Device>

First Application Example

Figure 25:
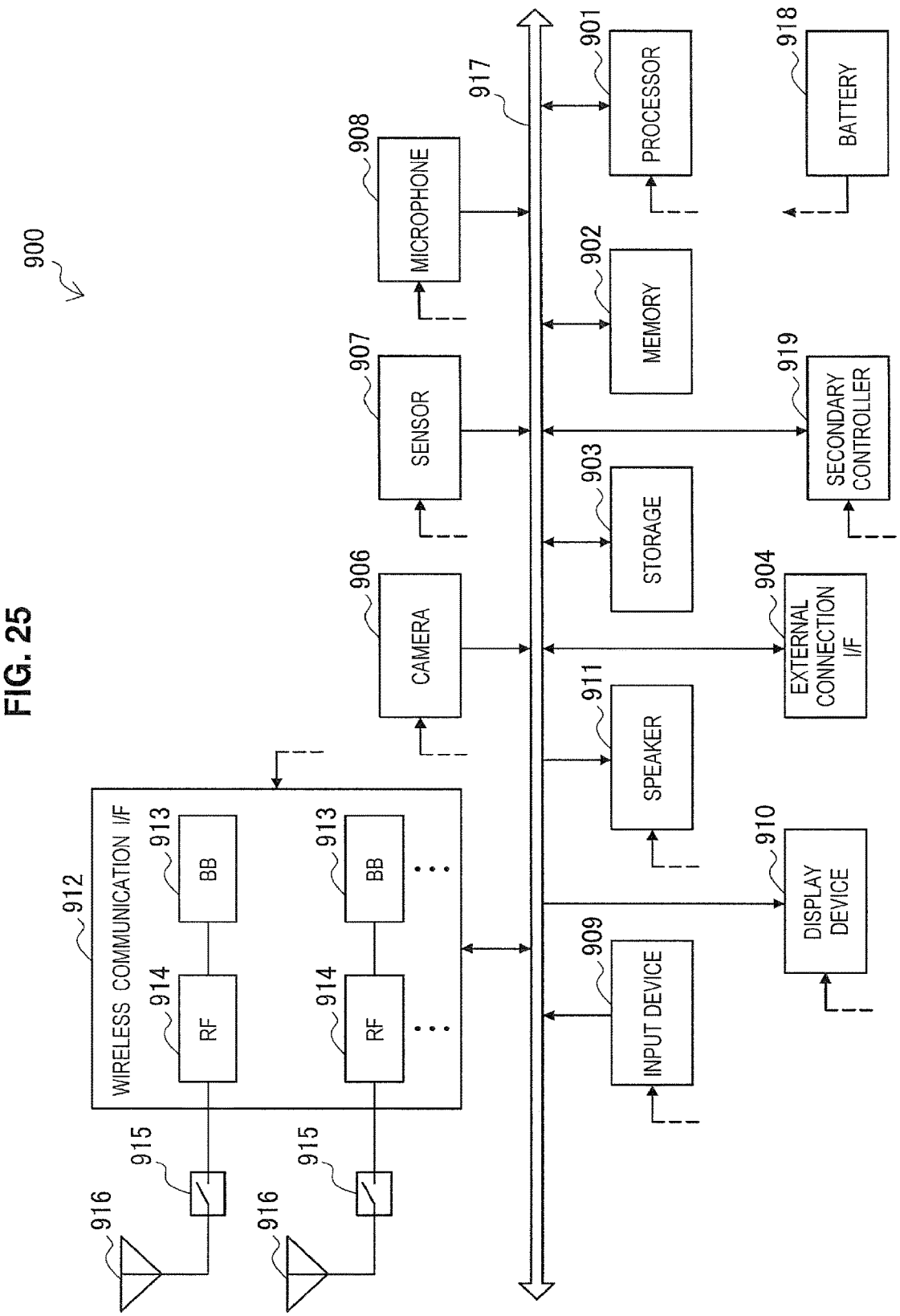
FIG. 25 is a block diagram illustrating an example of a schematic configuration of a smartphone.

FIG. 25 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 25. FIG. 25 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 25. FIG. 25 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other. The battery 918 supplies electric power to each block of the smartphone 900 illustrated in FIG. 25 via a feeder line that is partially illustrated in the figure as a dashed line. The secondary controller 919, for example, operates a minimally necessary function of the smartphone 900 in a sleep mode.

In the smartphone 900 illustrated in FIG. 25, one or more components included in the processing unit 340 described above with reference to FIG. 18 (the information acquiring unit 341 and/or the control unit 343) may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the smartphone 900, and the wireless communication interface 912 (for example, the BB processor 913), the processor 901, and/or the secondary controller 919 may execute the program. As described above, the smartphone 900 or the module may be provided as an apparatus including one or more of the components above, and the program causing the processor to function as one or more of the components above may be provided. A readable recording medium in which the program is recorded may be provided.

In the smartphone 900 illustrated in FIG. 25, for example, the wireless communication unit 320 described above with reference to FIG. 18 may be mounted in the wireless communication interface 912 (for example, the RF circuit 914). The antenna unit 310 may be mounted in the antenna 916.

Second Application Example

Figure 26:
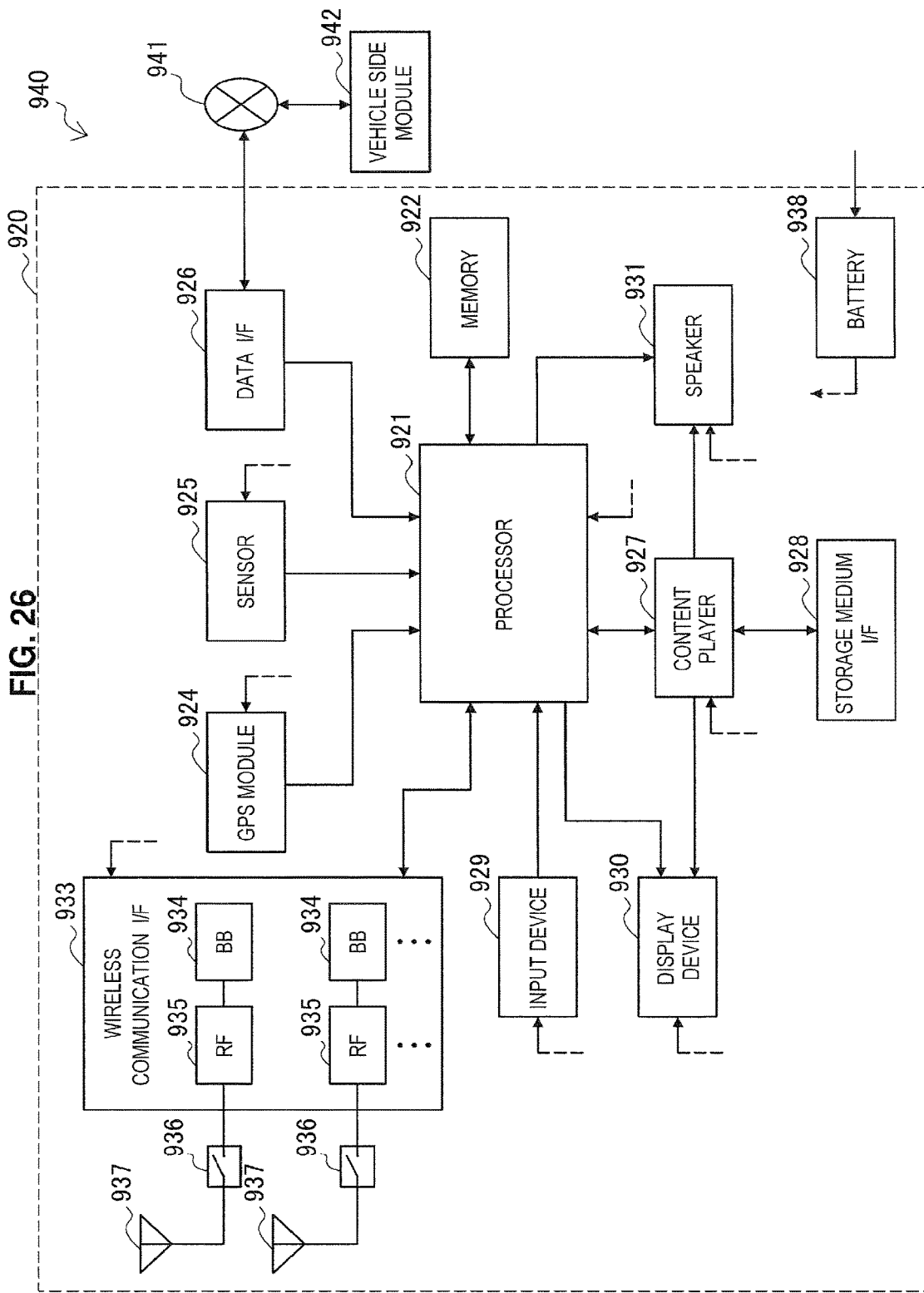
FIG. 26 is a block diagram illustrating an example of a schematic configuration of a car navigation apparatus.

FIG. 26 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, and an air pressure sensor. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 26. FIG. 26 illustrates an example in which the wireless communication interface 933 includes a plurality of BB processors 934 and a plurality of RF circuits 935, but the wireless communication interface 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 includes a plurality of antennas 937 as illustrated in FIG. 26. FIG. 26 illustrates an example in which the car navigation apparatus 920 includes a plurality of antennas 937, but the car navigation apparatus 920 may include a single antenna 937.

Further, the smartphone 920 may include the antenna 937 for each wireless communication system. In this case, the antenna switch 936 may be omitted from a configuration of the car navigation apparatus 920.

The battery 950 supplies electric power to each block of the car navigation apparatus 930 illustrated in FIG. 26 via a feeder line that is partially illustrated in the figure as a dashed line. The battery 950 accumulates the electric power supplied from the vehicle.

In the car navigation apparatus 920 illustrated in FIG. 26, one or more components included in the processing unit 340 described above with reference to FIG. 18 (the information acquiring unit 341 and/or the control unit 343) may be mounted in the wireless communication interface 933. Alternatively, at least some of the components may be mounted in the processor 921. As an example, the car navigation apparatus 920 may be equipped with a module including some or all components of the wireless communication interface 933 (for example, the BB processor 934), and/or the processor 921, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the car navigation apparatus 920, and the wireless communication interface 933 (for example, the BB processor 934), and/or the processor 921 may execute the program. As described above, the car navigation apparatus 920 or the module may be provided as an apparatus including one or more of the components above, and the program causing the processor to function as one or more of the components above may be provided. A readable recording medium in which the program is recorded may be provided.

In the car navigation apparatus 920 illustrated in FIG. 26, for example, the wireless communication unit 320 described above with reference to FIG. 18 may be mounted in the wireless communication interface 933 (for example, the RF circuit 935). The antenna unit 310 may be mounted in the antenna 937.

Further, the technique according to the present disclosure may be implemented as an in-vehicle system (or a vehicle) 940 including one or more blocks of the above-described car navigation apparatus 920, an in-vehicle network 941 and a vehicle side module 942. The in-vehicle system (or the vehicle) 940 may be provided as an apparatus including one more of the components above (the information acquiring unit 341 and/or the control unit 343). The vehicle side module 942 generates vehicle side data such as vehicle speed, engine speed and failure information and outputs the generated data to the in-vehicle network 961.

11. CONCLUSION

Each communication apparatus and each process according to the embodiments of the present disclosure have been described above with reference to FIGS. 9 to 26.

First Embodiment

In the first embodiment, the control entity 100 includes the information acquiring unit 131 configured to acquire information about a plurality of small cells and the control unit 133 configured to assign blank subframes in which no signal is transmitted and received to each of the plurality of small cells. The control unit 133 assigns the same subframes to one or more small cells that are a part of the plurality of small cells as the blank subframes and does not assign the same subframes to the remaining small cells among the plurality of small cells as the blank subframes.

Accordingly, for example, it is possible to suppress deterioration of communication quality of the terminal device while reducing interference from the small cell. More specifically, for example, interference from the remaining small cells to the one or more small cells may be removed. In addition, when the small cells are not completely switched to the off state and do not transmit a signal in a subframe unit, the terminal device can continue communication in the small cell. Therefore, deterioration of communication quality of the terminal device may be suppressed.

Second Embodiment

In the second embodiment, the terminal device 300 includes the information acquiring unit 341 configured to acquire information indicating decision of switching the small cell from the on state to the off state and the control unit 343 configured to request that the switching be canceled.

In addition, in the second embodiment, the control entity 400 includes the control unit 433 configured to decide to switch the small cell from the on state to the off state and the acquiring unit 431 configured to acquire a request that the switching be canceled. The control unit 433 cancels the switching in response to the request.

Accordingly, for example, it is possible to suppress deterioration of communication quality of the terminal device while reducing interference from the small cell. More specifically, for example, the small cell maintains the on state without switching to the off state as necessary. Therefore, deterioration of communication quality of the terminal device 300 may be suppressed. In addition, interference from the small cell may be suppressed according to the switching of the on/off state of the small cell.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while an example in which a communication system supports LTE or LTE-A has been described in embodiments of the present disclosure, the present disclosure is not limited thereto. For example, the communication system may be a system that supports another communication standard.

Further, it is not always necessary to execute the processing steps in the processing in the present specification in chronological order in order described in the flowcharts or the sequence diagrams. For example, the processing steps in the above-described processing may be executed in order different from the order described in the flowcharts or the sequence diagrams or may be executed in parallel.

Further, it is also possible to create a computer program for making a processor (such as, for example, a CPU and a DSP) provided at apparatuses (such as, for example, the control entity, the terminal device, or the modules thereof) in the present specification function as components (such as, for example, an information acquiring unit and the control unit) of the above-described apparatuses (in other words, a computer program for making the processor execute operation of the components of the above-described apparatuses). Further, it is also possible to provide a recording medium having the above-described computer program recorded therein. Further, it is also possible to provide an apparatus (such as, for example, a finished product and a module (such as parts, processing circuits and chips) for the finished product) including a memory having the above-described computer program stored therein and one or more processors which can execute the above-described computer program. Further, a method including the operation of the components (for example, an information acquiring unit and the control unit) of the above-described apparatuses is included in the technique according to the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
A device including:
an acquiring unit configured to acquire information about a plurality of small cells; and
a control unit configured to assign blank subframes in which no signal is transmitted and received to each of the plurality of small cells,
wherein the control unit assigns the same subframes to one or more small cells that are a part of the plurality of small cells as the blank subframes and does not assign the same subframes to the remaining small cells among the plurality of small cells as the blank subframes.

(2)
The device according to (1),
wherein the control unit assigns the blank subframes to each of the plurality of small cells based on an amount of traffic in each of the plurality of small cells.

(3)
The device according to (2),
wherein the control unit assigns fewer blank subframes to a first small cell having a greater amount of traffic among the plurality of small cells and assigns more blank subframes to a second small cell having a smaller amount of traffic among the plurality of small cells.

(4)
The device according to (1),
wherein the control unit equally assigns the blank subframes to each of the plurality of small cells.

(5)
The device according to any one of (1) to (4),
wherein the control unit does not assign a specific subframe to any of the small cells as the blank subframe.

(6)
The device according to (5),
wherein the specific subframe is a subframe in which a synchronization signal is transmitted.

(7)
The device according to any one of (1) to (6),
wherein the control unit assigns the same subframes to small cells excluding one small cell among the plurality of small cells as the blank subframes, and does not assign the same subframes to the one small cell as the blank subframes.

(8)
The device according to any one of (1) to (6),
wherein the control unit assigns each of at least one subframe to small cells excluding two or more small cells among the plurality of small cells as the blank subframe, and does not assign each of the at least one subframe to the two or more small cells as the blank subframe.

(9)
The device according to any one of (1) to (8),
wherein the plurality of small cells are a set of adjacent small cells.

(10)
The device according to (9)
wherein the plurality of small cells are small cells that are included in the same small cell cluster.

(11)
The device according to any one of (1) to (10),
wherein the control unit notifies a base station of each of the plurality of small cells of the assigned blank subframes.

(12)
A device including:
an acquiring unit configured to acquire information indicating decision of switching of a small cell from an on state to an off state; and
a control unit configured to request that the switching be canceled.

(13)
The device according to (12),
wherein, when a predetermined condition regarding a result of measurement performed by a terminal device is satisfied, the control unit requests the cancellation.

(14)
The device according to (13),
wherein the predetermined condition is a condition that a measurement result of the small cell be more favorable than a first threshold and a measurement result of each of the other cells be less favorable than a second threshold.

(15)
The device according to (14),
wherein the measurement result is reference signal received power (RSRP) or reference signal received quality (RSRQ), and
the predetermined condition is a condition that the measurement result of the small cell be greater than the first threshold and the measurement result of the other cells is smaller than the second threshold.

(16)
The device according to (14) or (15), wherein the other cells include a macro cell and other small cells.

(17)
The device according to any one of (12) to (16),
wherein the small cell is a serving cell.

(18)
The device according to any one of (12) to (17),
wherein the device is a terminal device or a module for a terminal device.

(19)
A device including:
a control unit configured to decide to switch a small cell from an on state to an off state; and
an acquiring unit configured to acquire a request that the switching be canceled,
wherein the control unit cancels the switching in response to the request.

(20)
The device according to (19),
wherein the control unit notifies a terminal device of the decision of the switching.

(21)
A method including:
acquiring information about a plurality of small cells; and
assigning, by a processor, blank subframes in which no signal is transmitted and received to each of the plurality of small cells,
wherein the assigning of the blank subframes to each of the plurality of small cells includes assigning the same subframes to one or more small cells that are a part of the plurality of small cells as the blank subframes and not assigning the same subframes to the remaining small cells among the plurality of small cells as the blank subframes.

(22)

A program for causing a processor to execute:
acquiring information about a plurality of small cells; and
assigning blank subframes in which no signal is transmitted and received to each of the plurality of small cells,
wherein the assigning of the blank subframes to each of the plurality of small cells includes assigning the same subframes to one or more small cells that are a part of the plurality of small cells as the blank subframes and not assigning the same subframes to the remaining small cells among the plurality of small cells as the blank subframes.

(23)

A readable recording medium having a program recorded thereon, the program causing a processor to execute:
acquiring information about a plurality of small cells; and
assigning blank subframes in which no signal is transmitted and received to each of the plurality of small cells,
wherein the assigning of the blank subframes to each of the plurality of small cells includes assigning the same subframes to one or more small cells that are a part of the plurality of small cells as the blank subframes and not assigning the same subframes to the remaining small cells among the plurality of small cells as the blank subframes.

(24)

A method including:
acquiring information indicating decision of switching of a small cell from an on state to an off state; and
requesting, by a processor, that the switching be canceled.

(25)

A program for causing a processor to execute:
acquiring information indicating decision of switching of a small cell from an on state to an off state; and
requesting that the switching be canceled.

(26)

A readable recording medium having a program recorded thereon, the program causing a processor to execute:
acquiring information indicating decision of switching of a small cell from an on state to an off state; and
requesting that the switching be canceled.

(27)

A method including:
deciding, by a processor, to switch a small cell from an on state to an off state; and
acquiring a request that the switching be canceled,
wherein the switching is cancelled in response to the request.

(28)

A program for causing a processor to execute:
deciding to switch a small cell from an on state to an off state; and
acquiring a request that the switching be canceled,
wherein the switching is cancelled in response to the request.

(29)

A readable recording medium having a program recorded thereon, the program causing a processor to execute:
deciding to switch a small cell from an on state to an off state; and
acquiring a request that the switching be canceled,
wherein the switching is cancelled in response to the request.

REFERENCE SIGNS LIST 1 communication system
2 communication system
100 control entity
131 information acquiring unit
133 control unit
300 terminal device
341 information acquiring unit
343 control unit
400 control entity
431 information acquiring unit
433 control unit

The invention claimed is:

1. A device, comprising:
circuitry including a processor and a memory, the circuitry configured to:
acquire information about a plurality of small cells from base stations that serve the plurality of small cells, wherein the information includes an identifier, for identifying each small cell, and an association of a terminal serviced in a small cell of the plurality of small cells with a packet arrival time; and
assign, based on the acquired information, an equal number of subframes to each of the plurality of small cells as blank subframes, in which no signal is transmitted and received, regardless of an amount of traffic in each of the small cells.

2. The device according to claim 1, wherein the circuitry is further configured to avoid assigning a specific subframe to any of the small cells as the blank subframe.

3. The device according to claim 2, wherein the specific subframe is a subframe in which a synchronization signal is transmitted.

4. The device according to claim 1, wherein the circuitry is further configured to
assign same subframes to small cells excluding one small cell among the plurality of small cells as the blank subframes, and
avoid assigning the same subframes to the one small cell as the blank subframes.

5. The device according to claim 1, wherein the circuitry is further configured to
assign each of at least one subframe to small cells excluding two or more small cells among the plurality of small cells as the blank subframe, and
avoid assigning each of the at least one subframe to the two or more small cells as the blank subframe.

6. The device according to claim 1, wherein the plurality of small cells are a set of adjacent small cells.

7. The device according to claim 6, wherein the plurality of small cells are small cells that are included in a same small cell cluster.

8. The device according to claim 1, wherein the circuitry is further configured to notify a base station of each of the plurality of small cells of the assigned blank subframes.

9. A method, comprising:
acquiring, from base stations that serve the plurality of small cells, information about a plurality of small cells, wherein the information includes an identifier, for identifying each small cell, and an association of a terminal serviced in a small cell of the plurality of small cells with a packet arrival time; and
assigning, based on the acquired information, an equal number of subframes to each of the plurality of small cells as blank subframes, in which no signal is transmitted and received, regardless of an amount of traffic in each of the small cells.

10. The method according to claim 9, further comprising avoiding assigning a specific subframe to any of the small cells as the blank subframe.

11. The method according to claim 10, wherein the specific subframe is a subframe in which a synchronization signal is transmitted.

12. The method according to claim 10, further comprising:
    assigning same subframes to small cells excluding one small cell among the plurality of small cells as the blank subframes; and
    avoiding assigning the same subframes to the one small cell as the blank subframes.

13. The method according to claim 10, further comprising:
    assigning each of at least one subframe to small cells excluding two or more small cells among the plurality of small cells as the blank subframe; and
    avoiding assigning each of the at least one subframe to the two or more small cells as the blank subframe.

14. The method according to claim 10, wherein the plurality of small cells are a set of adjacent small cells.

15. The method according to claim 14, wherein the plurality of small cells are small cells that are included in a same small cell cluster.

16. The method according to claim 10, further comprising:
    notifying a base station of each of the plurality of small cells of the assigned blank subframes.

17. A non-transitory computer readable medium storing computer executable instructions which, when executed by circuitry of a device, causes the circuitry to:
    acquire information about a plurality of small cells from base stations that serve the plurality of small cells, wherein the information includes an identifier, for identifying each small cell, and an association of a terminal serviced in a small cell of the plurality of small cells with a packet arrival time; and
    assign, based on the acquired information, an equal number of subframes to each of the plurality of small cells as blank subframes, in which no signal is transmitted and received, regardless of an amount of traffic in each of the small cells.

18. The non-transitory computer readable medium according to claim 17, wherein the circuitry is further caused to avoid assigning a specific subframe to any of the small cells as the blank subframe.

19. The non-transitory computer readable medium according to claim 18, wherein the specific subframe is a subframe in which a synchronization signal is transmitted.

20. The non-transitory computer readable medium according to claim 17, wherein the circuitry is further caused to:
    assign same subframes to small cells excluding one small cell among the plurality of small cells as the blank subframes; and
    avoid assigning the same subframes to the one small cell as the blank subframes.

\* \* \* \* \*